E. SCHEYER.
AUTOMATICALLY CONTROLLED MECHANISM.
APPLICATION FILED MAR. 13, 1913.
1,172,059.
Patented Feb. 15, 1916.
11 SHEETS—SHEET 1.
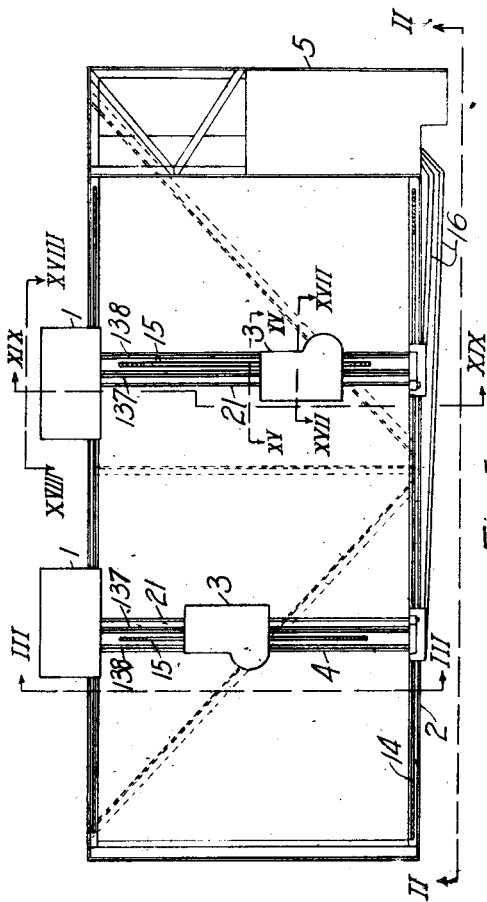
Fig. I
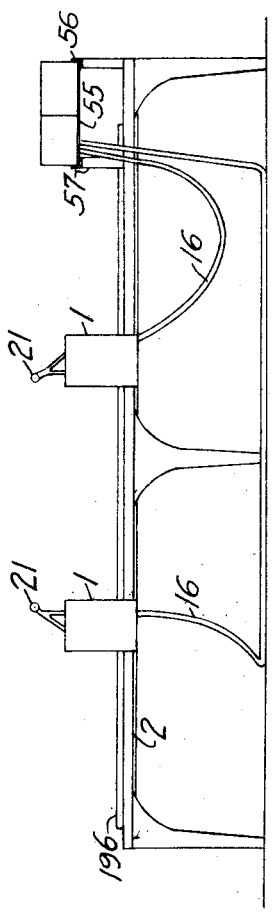
Fig. II
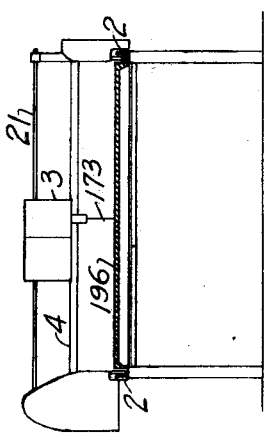
Fig. III
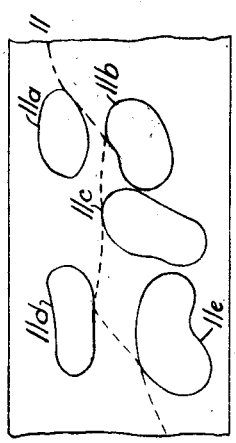
Fig. IV
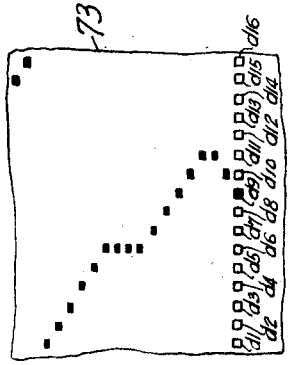
Fig. V
Witnesses:
Alfred Brady.
Samuel Singer
Inventor
Emanuel Scheyer.
By his Attorney
Albert Bram

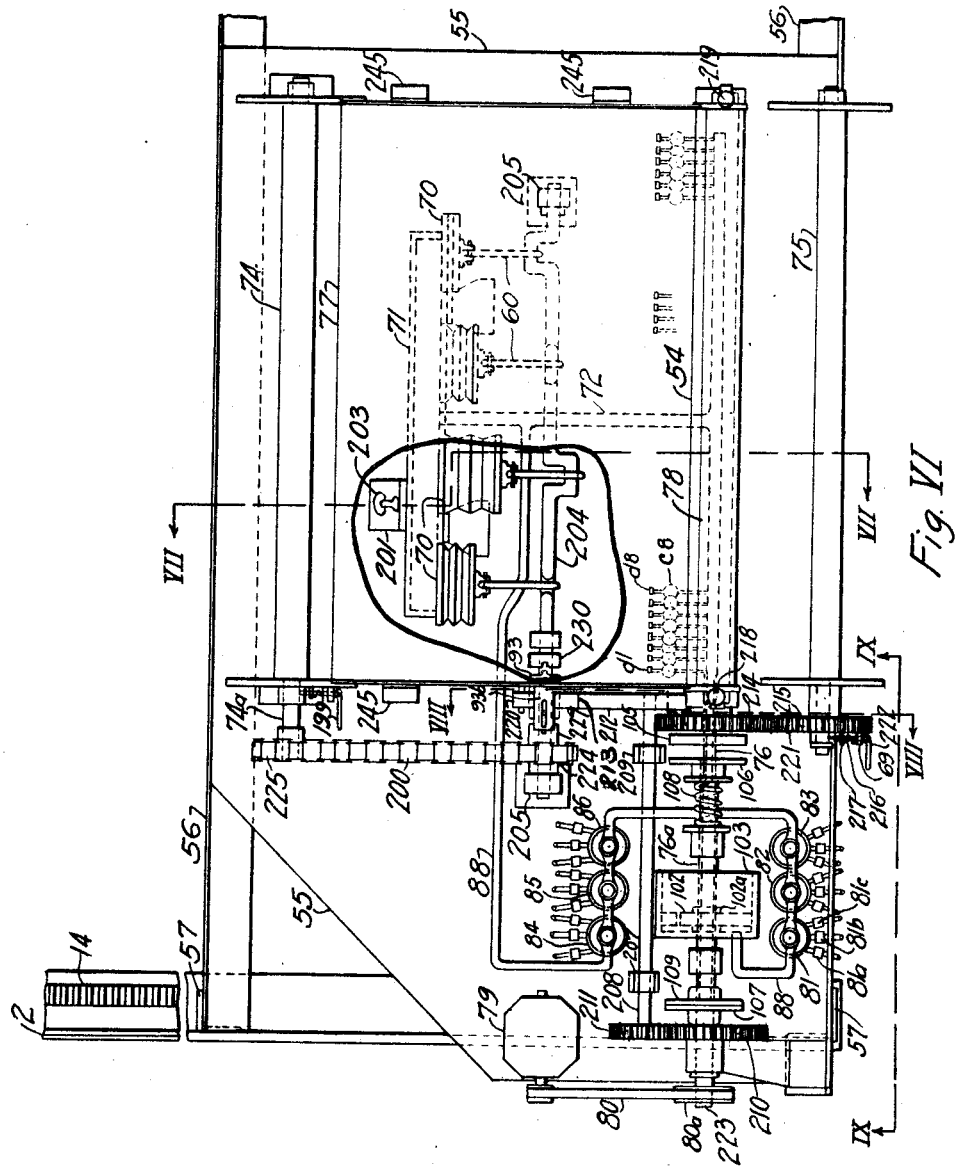

E. SCHEYER.
AUTOMATICALLY CONTROLLED MECHANISM.
APPLICATION FILED MAR. 13, 1913.
1,172,059.
Patented Feb. 15, 1916.
11 SHEETS—SHEET 3.
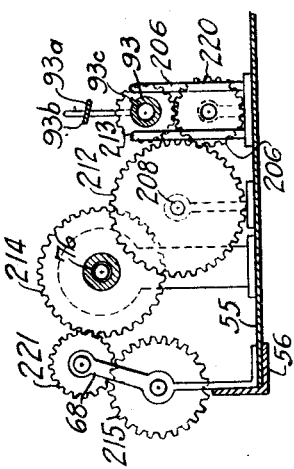
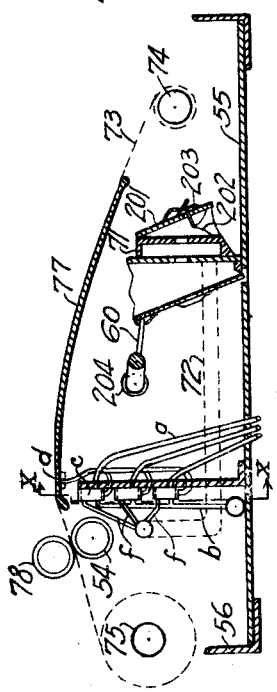
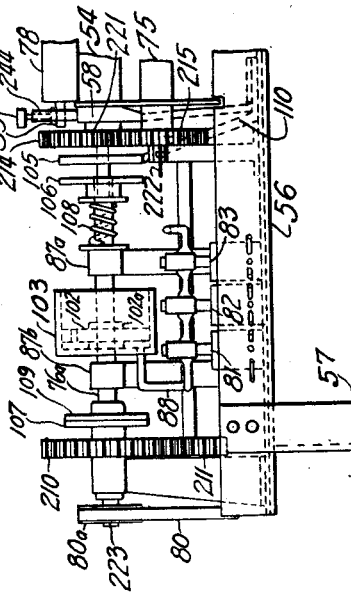
Witnesses:
Alfred Brady.
Samuel Singer
Inventor
Emanuel Scheyer.
By his Attorney
Albert Bersin

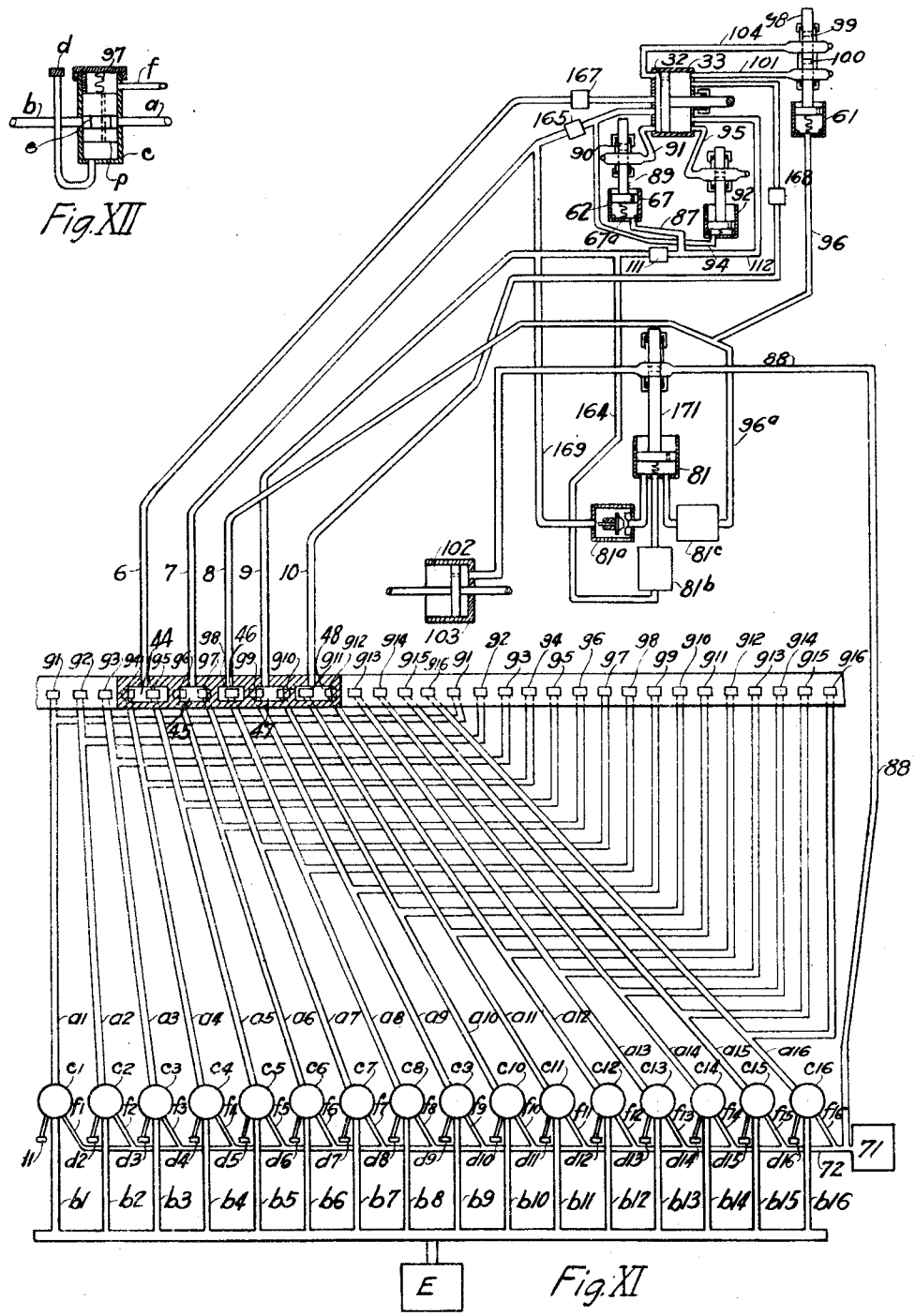

E. SCHEYER.
AUTOMATICALLY CONTROLLED MECHANISM.
APPLICATION FILED MAR. 13, 1913.
1,172,059.
Patented Feb. 15, 1916.
11 SHEETS—SHEET 5.
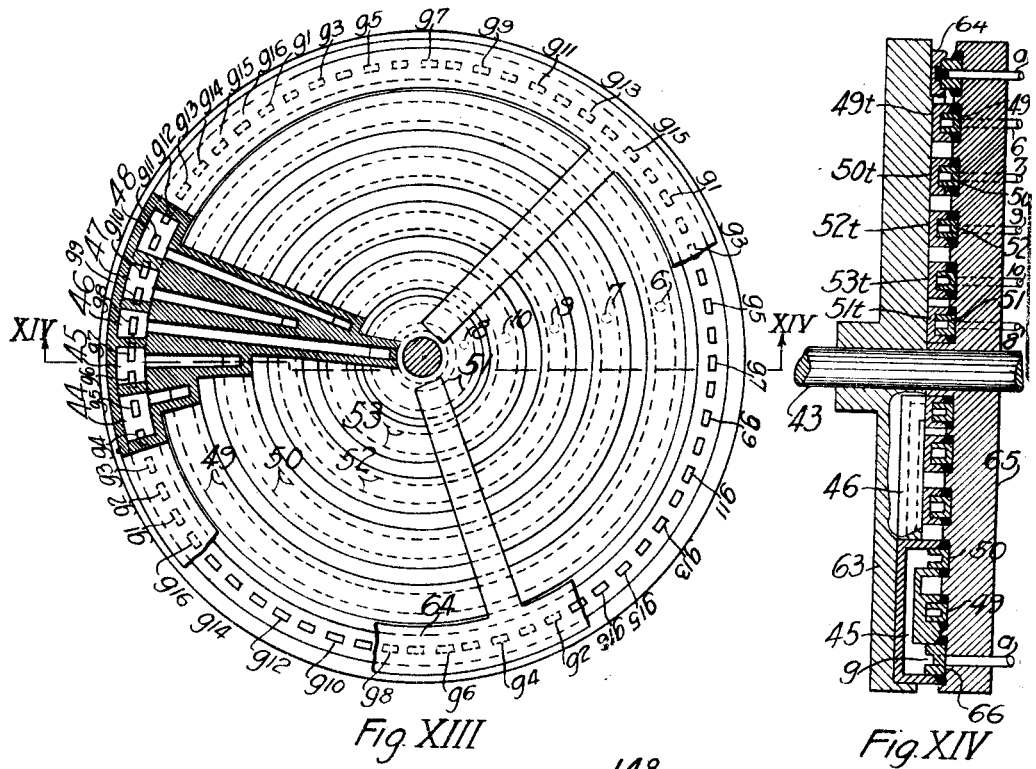
Fig. XIII
Fig. XIV
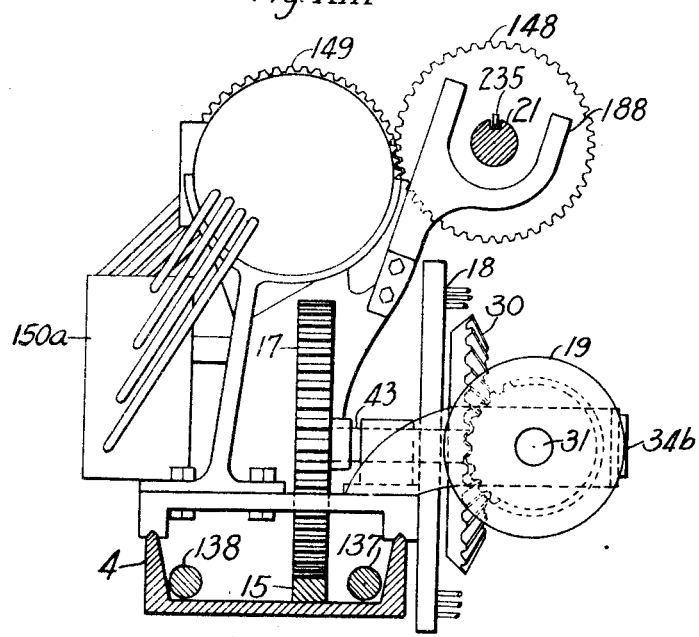
Fig XV
Witnesses.
Alfred Brady
Samuel Singer
Inventor
Emanuel Scheyer.
By his Attorney
Albert Bersin

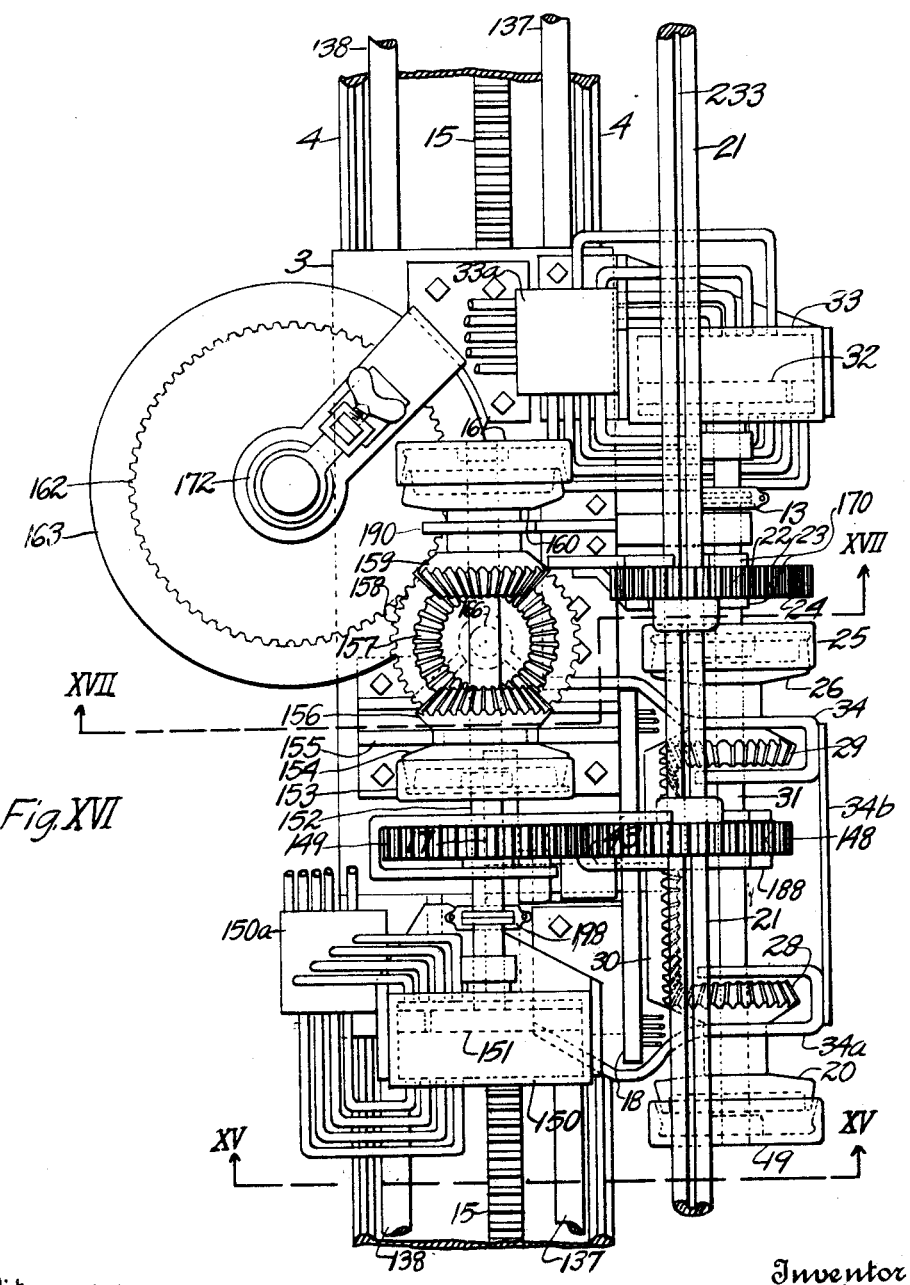

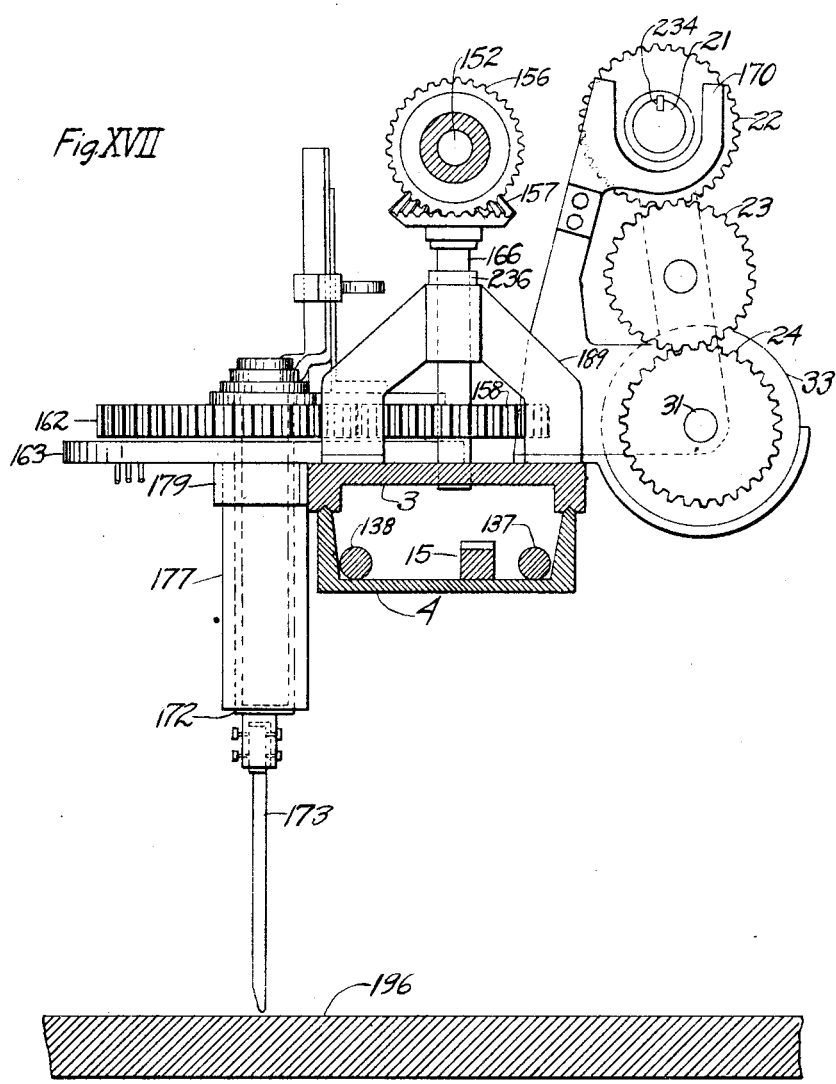

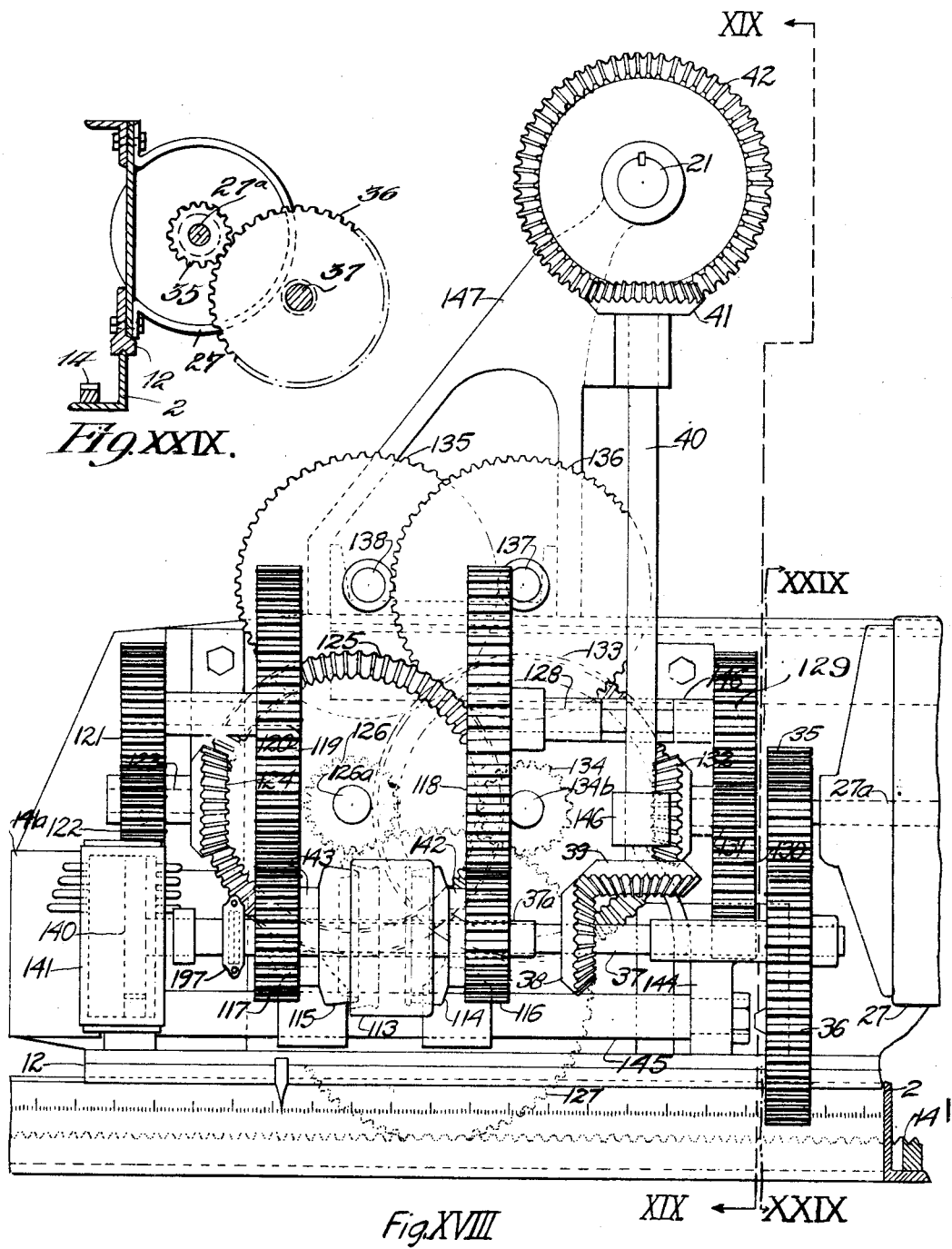

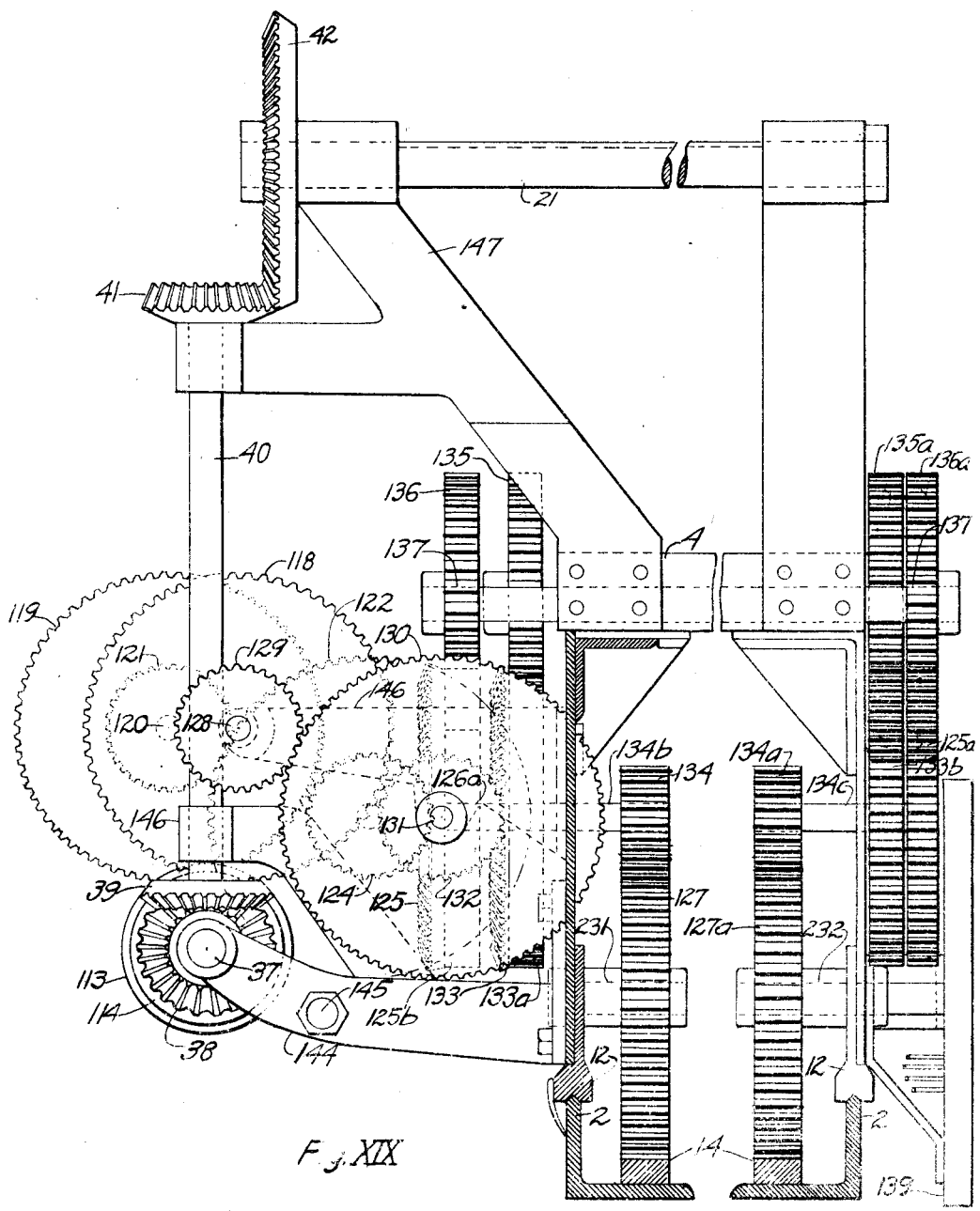

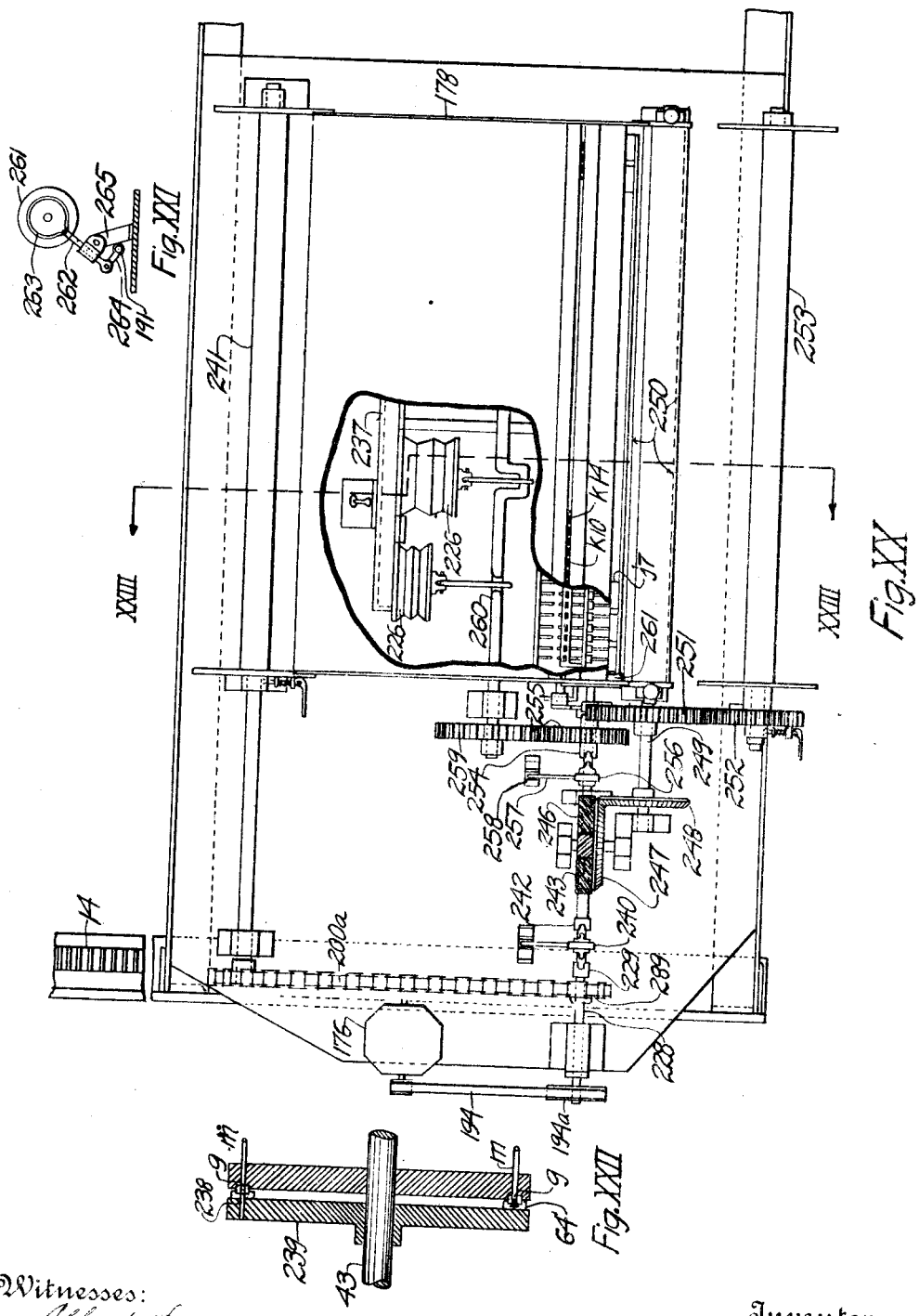

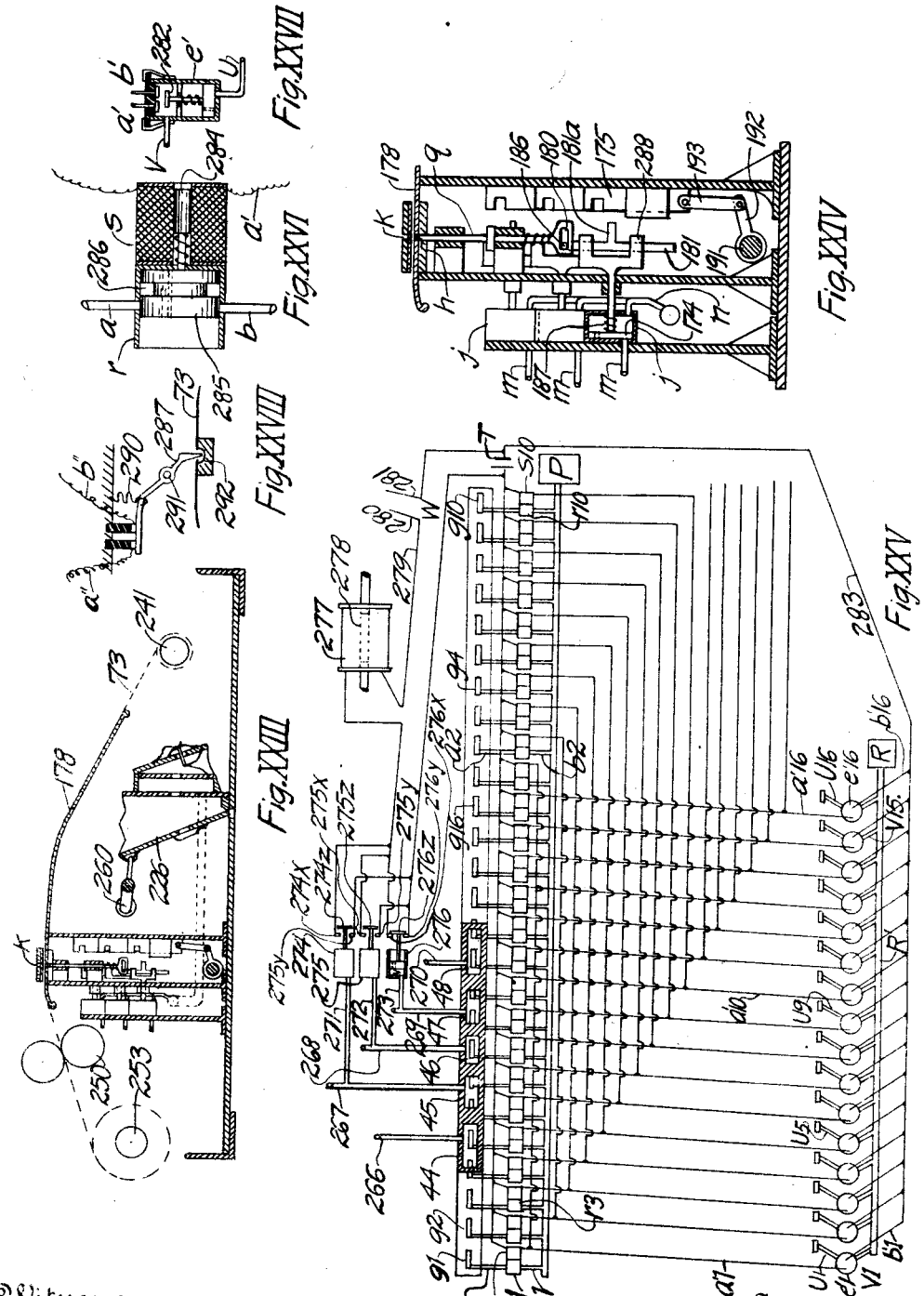

UNITED STATES PATENT OFFICE.

EMANUEL SCHEYER, OF NEW YORK, N. Y.

AUTOMATICALLY-CONTROLLED MECHANISM.

1,172,059.

Specification of Letters Patent. Patented Feb. 15, 1916.

Application filed March 13, 1913. Serial No. 754,024.

*To all whom it may concern:*

Be it known that I, EMANUEL SCHEYER, a citizen of the United States, residing at New York, county of New York, State of New York, have invented a new and useful Automatically - Controlled Mechanism, the essential elements of which were disclosed as another species in my application for patent filed December 16, 1912, Serial Number 737,072.

The object of my invention is to provide means for controlling motion in any direction in space, either in one plane or several, or angular motion, by means of a previously prepared record, such as a perforated sheet of paper or other material.

In the above mentioned previous application, I show my mechanism controlling the motion of a cloth cutting machine. In this application, I omit the cloth cutting apparatus, and show merely a tool, which may be of such construction to perform a given function. The device which I employ and which is described here, is a pneumatically controlled machine.

I obtain my object by having a perforated sheet pass over a series of tracker ducts. As the various perforations pass over the openings of the tracker ducts, corresponding valves are opened which connect an exhaust with certain arrangements of ducts. These ducts in turn connect with cylinders controlling clutches, which as will be hereinafter shown, control the motion of the body.
This motion can be continuous, changing gradually from one speed to another as called for by the sequence of the perforations past the different tracker ducts, as the record is fed by with a continuous motion.
The motion of the tool or any other part of a machine can be split up into component velocities as it travels along its path, a record is made of these velocities, then by using this record to control certain air circuits which in turn control means for transmitting motion, the original path of the tool is obtained. In this application the path of the tool is shown in one plane, but it will be evident from the subsequent description that if the path is in more than one plane, i. e., in space, all that would be necessary to accomplish this, would be to add a unit element for motion at an angle to the plane containing the motions of the other unit elements.

The mechanism of recording, of controlling and of transmitting of the motion of a component will be called a unit element. The direction in which a component velocity is to act having been determined, a unit element is arranged to take care of motion along this direction forward and backward. In cases of pure rotation, a unit element of angular velocity is provided. In the general case, any system of components can be chosen. In the particular construction here-in disclosed, rectangular components are used. They are the longitudinal velocity and the transverse velocity of the tool as it travels along its path. A third velocity is used which gives the tool an angular or slope velocity. The unit element of longitudinal velocity will be called the longitudinal motion, that of the transverse velocity, the transverse motion, and the unit element of angular velocity, the slope motion.

The method of controlling the motion of this machine is essentially the same as that used in the pneumo-electrically controlled machine disclosed in the original application mentioned above, except that instead of electric currents, air currents are used. Similarly, instead of using solenoids to control the clutches, air cylinders are used here. The other features of this machine will be made evident from the detailed description.

Reference is to be had to the following drawings forming a part of this specification in which—

Figure I is a general plan of the table showing two machines mounted on same. Fig. II is a longitudinal elevation of the table taken along the line II—II. Fig. III is a section taken along the line III—III. Fig. IV is a diagram of the path of the tool over a given piece of work. Fig. V is a portion of the perforated record. Fig. VI is a plan of the control mechanism. Fig. VII is a section of the control mechanism taken along the line VII—VII of Fig. VI. Fig. VIII is a section of the control mechanism taken along the line VIII—VIII of Fig. VI. Fig. IX is a partial elevation of the control mechanism taken along the line IX—IX of Fig. VI. Fig. X is an enlarged section taken along the line X—X of Fig. VII. Fig. XI is a diagram of the arrangement of air passages showing the method of controlling a unit element. Fig. XII is an enlarged detail of a cylinder *c*. Fig. XIII is a plan of a typical selector with arms shown in section. Fig. XIV is a section of the selector taken along the line XIV—XIV of Fig. XIII. Fig. XV is an end view of the transverse carriage taken along the line XV—XV of Figs. I and XVI. Fig. XVI is a plan of the transverse carriage. Fig. XVII is a sectional elevation of the transverse carriage taken along the line XVII—XVII of Figs. I and XVI. Fig. XVIII is an end view of the longitudinal carriage taken along the line XVIII—XVIII Fig. I. Fig. XIX is a partial sectional elevation taken along the line XIX—XIX of Figs. I and XVIII. Fig. XX is a plan of the recording mechanism. Fig. XXI is a detail showing the cam driving the rock shaft. Fig. XXII is a section of the recording selector. Fig. XXIII is a section taken along the line XXIII—XXIII of Fig. XX. Fig. XXIV is an enlarged detail of the punching mechanism. Fig. XXV is a diagram of a combined pneumatic and electrical control method. Fig. XXVI is a detail of cylinders r of Fig. XXV. Fig. XXVII is a detail of cylinders e' of Fig. XXV. Fig. XVIII shows an alternative method to that shown in Fig. XXVII for closing circuits by means of a perforated record. Fig. XXIX is a section showing the gearing between the motor and shaft 37.

Referring to Fig. I, the controlling mechanism 5, inclosed in a suitable casing is located at the end of the table 196. The two cables 16 contain the tubes connecting the controlling mechanism 5 with the longitudinal carriage 1. The cables connecting the transverse carriage 3 with the controlling mechanism 5, will be carried above the machine by means of trolleys and wires strung above the machine.

Referring to Figs. VI, VII, XVIII and XIX, the perforated record 73 is fed by being gripped between the two rollers 54 and 78, and is wound on the take up spool 75. The roller 54 drives with the idler spool 78 pressing against it. The shaft 76, which is a continuation of the roller 54, extends through the disk 105, which is one part of a friction clutch. The disk 105 in turn is attached to the bracket 110, a part of the frame, and is thus fixed against rotation. The mating part of this friction clutch, 106, is fixed to the hollow shaft 76ª, the end of which fits over the shaft 76. The shaft 76ª revolves in bearings 87ª and 87ᵇ, and is provided with a slot. The shaft 76 is provided with a feather so that the hollow shaft 76ª slides over the shaft 76 longitudinally, but the two rotate together. The cylinder 103, open to the atmosphere at one end and to the pipe 88, connected with the exhaust chamber 71, at the other end, is concentric with the shaft 76ª. The piston 102, sliding in the cylinder 103, fits loosely over the shaft 76ª and is held in place by the two sleeves 102ª, so that when the shaft 76ª rotates, the piston 102 can be stationary, but when the piston 102 slides in the cylinder 103 it will move the shaft 76ª longitudinally. 109 is one part of a friction clutch, and is rigidly attached to the shaft 76ª. The mating part of this friction clutch, 107, is rigidly attached to shaft 223, which is driven by motor 79 by means of belt 80 and pulley 80ª. Any other source of power instead of the motor 79 may be used. If the pipe 88 be connected with the exhaust, the piston 102 will move to position shown in Fig. VI, thereby engaging the clutch part 107 with the clutch part 109 and shaft 76ª will be driven and roller 54 will feed the record 73. If now the exhaust be shut off at the tube 88, atmospheric pressure entering through the leak hole will equalize the pressure on both sides of it. The spring 108 will then push shaft 76ª and piston 102 toward the right, thereby disengaging the disks 107 and 109 and engaging the disk 106 with the disk 105 and the feeding of the record will stop. It is therefore evident that in order to feed the record, the cylinder 103 must be connected to the exhaust. The method of controlling the above connection and the purpose of same will be explained later. The feed roller 54 revolves in bearings in frames 58 at both ends. The upper part of the frame 58 is provided with a slot in which the end pins of the idler roller 78 fit. Bearing pieces 59 are placed in the slot, and are adapted to bear on the pins at the ends of roller 78. The screws 218 and 219 press springs 244 against the pieces 59, and thus the idler roller 78 is made to bear against the feed roller 54. The pressure can be increased or diminished by screwing the thumb screw 218 and 219 down or up. The perforated sheet is passed between the rollers 54 and 78 and is pulled forward by the rotation of the feed roller 54 against the idler roller 78. The gear 214 is fixed to shaft 76, and drives gear 221 revolving in bearings in frame 68. The gear 215 driven by gear 221, grips the shaft to which the take up spool 75 is attached by means of friction. The lug 69 on gear 215 is provided with a hole into which the pin 217 fits. The pin 217 also fits into a hole in the hub of gear 215, and by means of spring 216 is brought to bear against the end shaft of spool 75. The pin can be raised by means of cam 222. If the gear 215 rotates faster than the record is fed, the gear 215 will slide over the end shaft of spool 75. The gear 210 is fixed to shaft 223, and drives gear 211 fixed to shaft 208, which revolves in bearings 207 and 209 and drives gear 212 fixed to it. The gear 220 driven by gear 212 in turn transmits motion to gear 213, which slides over the sliding part of clutch 93 and is made to turn with it by feather 93ᶜ. The clutch 93 fits loosely over shaft 204. The bearing frames 205 support shaft 204. The gear 213 is held laterally by the four uprights 206. 230, the mating part of the clutch 93 on the right is fixed to shaft 204 and its mating part 227 on the left is attached to the sprocket wheel 224. The clutch part 227 and the sprocket wheel 224 fit loosely over 204 which is extended through bearing frame 205. When the clutch 93 is thrown to the right, the shaft 204 is rotated, and consequently the bellows 70 operate. When the clutch 93 is kept in the center, the gear 213 rotates idly. If the clutch 93 is thrown to the left it engages its mating part 227, and the sprocket wheel 224 is rotated. The sprocket wheel 224 drives sprocket wheel 225 by means of chain 200. The sprocket wheel 225 is attached to shaft $74^a$ over the end of which the record spool 74 fits loosely. The spool 74 is made to rotate by shaft $74^a$ by means of a friction arrangement similar to that on spool 75; this arrangement is released by means of cam 199. To rewind the record the cam 199 is clamped down, the cam 222 is raised and the clutch 93 is thrown into its mating part 227. When the machine is in operation, the cam 222 is clamped down, the cam 199 is raised and the clutch 93 is thrown into its mating part 230. The record will then wind up on the take up spool 75 passing over the tracker board. In order to conveniently throw the clutch 93, it is provided with a groove, over which a loose collar is fitted. The pin $93^a$ is screwed into that collar and is held in place by the plate $93^b$, provided with a slot. To throw the clutch, the pin $93^a$ is pulled to either side. The plate 77 is used as a guide and support for the record sheet. It is held in place by the uprights 245.

It was shown above how the source of power drives shaft 204. The exhaust bellows are in turn operated by means of crank rods 60. The exhaust bellows are connected with an air chamber 71 which is kept below atmospheric pressure. The cylinders $c^1$, $c^2$, $c^3$, etc., are connected to exhaust chamber 71 by means of the pipe 72 and branch pipes $f^1$, $f^2$, $f^3$, etc.

201 is a device known as the pressure regulator. By means well known to the art, the spring 202 forces open the valve 203 when the reduction of pressure becomes too great, i. e., greater than a predetermined reduction. This permits air at atmospheric pressure to enter, which brings the pressure up to the proper point, when the valve 203 closes again.

In Fig. XI, a layout of the air circuits for one unit element is shown diagrammatically. In Fig. XII, one cylinder $c$ is shown in section. The tracker duct $d$ connects with the bottom of the cylinder. The piston $p$ is provided with a groove $e$, encircling same. The cylinder is provided with two ports. The tube $b$ entering at one of these ports is connected to exhaust E. The tube, $a$, leading from the other port connects to the selector ports, the function of which will be hereinafter explained. The tube $f$ connected to tube 72 which leads to exhaust chamber 71, enters cylinder $c$ at a point above the uppermost position of piston $p$. The piston $p$ provided with a leak hole is normally kept down by the spring 97. The record sheet 73 is passed over the tracker ducts $d^1$, $d^2$, $d^3$, etc. and the bellows 70 started so that the exhaust chamber 71 is brought below atmospheric pressure. When a duct $d$ is kept closed by the record sheet passing over same, it is soon exhausted by leakage through the leak hole so that the interior of its cylinder $c$ is below atmospheric pressure. Then spring 97 will keep the piston $p$ down shutting off the exhaust E from tube $a$. If a perforation now comes over the tracker duct, air at atmospheric pressure enters the duct $d$ and the piston $p$ moves up to position shown in Fig. XII until the groove $e$ comes opposite the tubes $a$ and $b$ connecting the tubes $a$, with the exhaust E. As soon as the perforation passes from the duct $d$, the exhaust 71 will soon exhaust the tube $d$ and the interior of the cylinder $c$ and the spring will force the piston $p$ down, shutting off the flow from the tube $a$ to the exhaust E. Instead of an exhaust, E may be a compression pump. It will be hereinafter shown that when a particular perforation passes over its corresponding tracker duct, and actuates its particular cylinder $c$, and connects its corresponding tubes $a$ and $b$, that the fluid passing from the exhaust E, or flowing toward E, depending on whether an exhaust or a plenum system is used, will follow different paths through either one of the selector arms 44, 45, 46, 47 or 48, and will finally cause piston 32 in cylinder 33 to move to either one end or the other or to neither end. It will also be shown that when the piston 32 is forced toward one end it will tend to send the body whose motion is to be controlled in one direction, when the piston 32 is forced toward the other end it will tend to move the body in the opposite direction, and when the piston has equal pressures on each side of it, the body will not be driven except by inertia.

In Figs. XIII and XIV are shown a plan and section of one of the three selectors used in this machine, with arms shown in section on the plan, one for each unit element. The disk 65 is fixed to the carriage and travels with same. It is provided with a series of ports $g^1$, $g^2$, $g^3$, etc. around the disk. Each one of these ports is connected by means of tubes $a^1$, $a^2$, $a^3$, etc. to cylinders $c^1$, $c^2$, $c^3$, etc., as shown diagrammatically in Fig. XI.

The number of ports $g^1$, $g^2$, $g^3$, etc., are taken in multiples of 16 as shown from $g^1$ to $g^{16}$, and then repeated in cycles. All ports marked $g^1$ are connected by the same tube to cylinder $c^1$, all marked $g^2$ are connected to cylinder $c^2$, and so on, so that there are sixteen circuits with several multiples of ports around the disk. There are two cycles shown in Fig. XI. The number sixteen was chosen for convenience, another number could have been used provided the number of openings included between the extreme arms is the minimum. A ring 66 provided with holes corresponding to the ports $g^1$, $g^2$, $g^3$ etc. is attached to the disk 65. 49, 50, 51, 52 and 53 are 5 concentric channel shaped rings attached to the disk 65, which together with their respective top pieces form five independent air passages. $49^t$, $50^t$, $51^t$, $52^t$ and $53^t$ are the channel shaped top pieces fitting over the channel shaped rings 49, 50, 51, 52 and 53 respectively, provided with suitable packing. 44, 45, 46, 47 and 48 are five hollow arms preferably made of one piece, one end of each fitting over the ring 66 and suitably packed to make an air tight joint. The number of ports $g$, covered by the selector arms need not be as shown. By varying the number of these ports covered by each arm, the accuracy and manner of control is varied. At the other end the arm 44 communicates with the chamber 49, the arm 45 with the chamber 50, the arm 46 with the chamber 51, the arm 47 with the chamber 52 and the arms 48 with the chamber 53. The arms 44, 45, 46, 47 and 48 are fixed to the channel shaped top pieces $49^t$, $50^t$, $51^t$, $52^t$ and $53^t$, and are all fixed to plate 63 and rotate with same. The plate 63 being fixed to shaft 43 rotates with same. The plate 63 need not be direct connected to shaft 43 or in general, to the shaft of the driving gear of the unit element. This plate 63 can be connected to a shaft geared to the shaft 43 making more or less revolutions than 43. The accuracy of control is increased, the larger the relative rotation of the shaft on which the plate 63 is fixed is to that of the shaft 43. The flange 64 attached to the plate 63 closes all the ports $g$ not covered by the selector arms by means of the strip of packing fixed to it. The chamber 49 is connected with the cylinder 33 by means of tube 6, the chamber 50 is connected to the cylinder 33 by means of tube 7, the chamber 52 by tube 9, and the chamber 53 by tube 10, the chamber 51 by means of tube 8 connects with cylinder 61, which as will be hereinafter shown opens both ends of cylinder 33 to the atmosphere.

Referring to Fig. XVI. 18 is the selector, suitably inclosed in a casing for the transverse motion similar to the one just described. There are similar ones for the longitudinal motion and for the slope motion. As was stated above, the disk 65 is fixed to the carriage while the plate 63 and the selector arms rotate with the shaft 43. It will be shown later that when the carriage moves in one direction, the shaft 43 and the selector arms move in one direction, if the carriage moves in the opposition direction, the shaft 43 and the arms then rotate in the opposition direction. 33 is the cylinder shown in the diagram Fig. XI. 62 is a cylinder connected by means of tube 87 to a system of tubes which are at certain intervals connected with the exhaust E. The other end of the cylinder 62 is open to the atmosphere. The piston 67 provided with a leak hole is normally held in the position shown, by spring $67^a$ when the atmospheric pressure is on both sides of the leak hole. The bar 89 provided with a hole 90 is attached to the piston 67 and passes through an opening in tube 91, which has one end open to the atmosphere and has the other end connected to cylinder 33. When the bar 89 is in the position shown, the tube 91 is not open to the atmosphere. If now the tube 87 be connected with the exhaust, the piston 67 will be pulled down against the spring $67^a$ until the hole 90 comes opposite the opening in tube 91 and opens the cylinder 33 on one side of piston 32 to the atmosphere. Similarly 92 is a cylinder connected by tube 94 to a system of tubes open at intervals, to the exhaust. The cylinder 92 controls the opening and closing of the cylinder 33 to the atmosphere through tube 95 on the opposite side of piston 32. 61 is another cylinder similar to the cylinder 62, but its rod 98 has two holes, 99 and 100, which open and close simultaneously tubes 101 and 104 connected to the ends of cylinder 33. The cylinder 61 is connected to exhaust through tube 96 and a system of tubes. It will be shown that cylinders 33, 61, 62 and 92 are actuated as called for by the perforation of the record and the position of the selector arms, as are also cylinders 103 and 81.

The position of the piston 32 in cylinder 33 controls the motion of the carriage. The relation between the selector arms, perforations of record and position of piston will now be shown. Fig. V shows a piece of the perforated record passing over a set of tracker ducts for one unit element. For illustration, it will be assumed that at a certain instant the carriage is in such a position that the arms of the selector are in the position shown diagrammatically in Fig. XI, viz., arm 45 at ports $g^6$ and $g^7$, arm 46 at port $g^8$, etc. and the record in such a position that a perforation is at tracker duct $d^9$. This will send the piston $p^9$ in cylinder $c^9$ to a position as shown in Fig. XII, bringing groove $e^9$ opposite tubes $a^9$ and $b^9$, thereby connecting the tube $a^9$ with the exhaust E. The exhaust will now exhaust the air through the tube $a^9$, through the selector port $g^9$, through selector arm 47, through chamber 52, thence through tube 9, through valve 111, through tube 112 to cylinder 33. At the same time the cylinder 62 is actuated by the exhaust working through tube 87 thereby opening the cylinder 33 to the atmosphere on one side of the piston 32, while the other side is exhausted through tube 112 causing the piston 32 to be forced toward tube 112. The exhaust will also actuate cylinder 81 through tube 164 and valve $81^b$. The function of the piston 81 will be explained later. The valve 111 is of a type well known to the art. The valve $81^a$ shown in section, valves $81^b$, $81^c$, 165, 167 and 168 are similar to valve 111. They will allow the exhaust to work in one direction through them, that is away from the cylinders they connect to, but will close if the exhaust is in the opposite direction, that is from the cylinders. It will be shown later that when the piston 32 is moved to the position just described the carriage is sent forward. As the sheet 73 continues to feed, the second perforation comes over the next tracker duct, and in the same manner as before the cylinder $c^{10}$ is actuated and the tube $a^{10}$ is connected with the exhaust E. As the carriage moved forward due to the preceding perforation at the tracker duct $d^9$, the arms of the selector also moved forward and the arm 47 now covers the ports $g^{10}$ and $g^{11}$ so that the circuit just described is flowing again, and as before the carriage is sent forward, and the arm 47 covers the ports $g^{11}$ and $g^{12}$. The third perforation now passes over the duct $d^{11}$ actuating the cylinder $c^{11}$ causing motion in the forward direction again and bringing arm 47 over the ports $g^{12}$ and $g^{13}$. At the same time, the other arms 44, 45, 46 and 48 travel along in their same relative positions with arm 47. The fourth perforation also passes over the duct $d^{11}$ actuating the cylinder $c^{11}$ and keeping the tube $a^{11}$ open to the exhaust. The arm 46 is now on port $g^{11}$ connecting with the tube $a^{11}$. This opens the following circuit to the exhaust. The exhaust E will exhaust through the tube $a^{11}$, through selector port $g^{11}$, through selector arm 46, through chamber 51, through tube 8, through the tube 96 to cylinder 61, thereby bringing rod 98 down and opening both sides of the cylinder 33 to the atmosphere. As the piston 32 has equal pressure on both sides the carriage will remain stationary neglecting for the purpose of illustration the effect of inertia. An equivalent result is obtained if the ends of the tubes 101 and 104 are connected to each other instead of opening to the atmosphere. The exhaust at the same time actuates cylinder 81 through tube $96^a$ and valve $81^c$. The purpose of the cylinder 81 is to control the feeding of the record and will be explained later. As the record continues to feed, the fifth perforation now passes over the duct $d^{10}$. This will actuate cylinder $c^{10}$ opening the exhaust to the tube $a^{10}$. As the carriage was stationary the selector arm 45 remained over the ports $g^9$ and $g^{10}$. The exhaust E will now exhaust through the tube $a^{10}$ through selector port $g^{10}$, through arm 45, through chamber 50, through tube 7, through valve 165, exhausting one end of cylinder 33, and at the same time actuating cylinder 92, through tube 94, thereby opening the opposite end of the cylinder 33 to the atmosphere. The cylinder 81 is also exhausted through tube 169 and valve $81^a$. The piston 32 is forced to the other end of the cylinder 33 and the carriage will now be sent backward in the opposite direction to what it had before. The selector arm 45 is now brought over ports $g^8$ and $g^9$. The sixth perforation actuates cylinder $c^9$ and the carriage is sent still farther back. The motion back and forth is thus continued according to the position of the perforations.

In Fig. V, the perforations are shown spaced with an interval between them in the direction of the feed of the record as well as across the sheet. In this particular application of my device, I shall space the perforations with an overlap in the direction of travel of the record, although not shown thus, for the sake of clearness in showing the individual perforations. If the tracker duct openings $d$ are made wide enough in the direction of the feed of the record, to cover a little greater width than the distance between the edges of successive perforations in the case where the perforations do not overlap, the result is equivalent to overlap. The said result is that there is always an air cylinder $c$, actuated, which will give a smooth working machine.

The explanation of the perforations and their effect so far has been for one unit element. In order that the three unit elements should be controlled simultaneously the perforations corresponding to several unit elements are placed abreast of each other. In the case of two machines of three unit elements apiece working at the same time over different paths, the perforations of the six unit elements are abreast. As the record is fed, the several unit elements of a machine act together, each bringing about its component motion. The combination is the resultant motion desired.

The ports of the selector are shown in cycles and are arranged around the periphery of the selector. In case of short travel, the openings could be arranged in one or more cycles in a line along the direction of motion of the unit element and the arms 44, 45, etc. attached to the body of the unit element, so that as it moved along, the arms could pass over the ports. The arrangement of ports and arms shown diagramatically in Fig. XI illustrates this. The ports $g$ are of such width and so spaced that no port is left unconnected to an arm, between the several arms. Means well known to the art, will be used to eliminate leakage wherever it is necessary. The two other arms of the selector 44 and 48 come into use only when the driving mechanism fails to act in unison with the controlling mechanism. It will be recalled in the earlier part of this specification where the record feeding mechanism was described that, in order to have the record feed, the clutches 107 and 109 had to be engaged, otherwise the record sheet would stop feeding. In order to have the above clutches engaged, the cylinder 103 must be connected with the exhaust thereby bringing piston 102 toward clutch 107. See Figs. VI and IX.

Referring now to Fig. XI, the cylinder 102 is connected to the exhaust by means of tube 88. The rod 171 provided with a port, will normally keep the exhaust shut off from the cylinder 103. If now the cylinder 81 be exhausted, it will pull the rod 171 down and thereby connect the exhaust 71 with the cylinder 103. It is therefore evident that in order to have the record feed the cylinder 81 must connect with its exhaust. In describing the air circuits flowing through either of the selector arms 45, 46 and 47, it was shown that in every case the exhaust was connected with the cylinder 81. If now a circuit is formed where the cylinder 81 is not connected with the exhaust the rod 171 will be sent up by its spring, closing the flow through tube 88 and the record will stop feeding. Let it be assumed now that something has happened to retard the motion of the carriage while the record continues to feed, assuming the record in the position shown in Fig. V, and the arms of the selector in the position shown in Fig. XI and the first perforation has just passed over the tracker duct $d^9$. Now if the driving mechanism fails to respond owing say to inertia, the arm 47 remains over the port $q^9$ when the next perforation comes over the duct $d^{10}$. If there is still no movement of the carriage when the third perforation comes over the duct $d^{11}$, a circuit through arm 48 and port $q^{11}$ is opened. The exhaust to E now is through the tube $a^{11}$, through port $q^{11}$, through arm 48, through chamber 53, tube 10, valve 168 to cylinder 33. It will be noted that the cylinder 81 is not actuated now, and therefore the record will stop feeding. This will allow the driving mechanism to catch up with the record. As the travel of the carriage continues, it brings the arm 47 up to port $q^{11}$ once more, causing the flow to pass through arm 47, actuating the cylinder 81 and starting the feed of the record again. That the record is stopped every time the record and body get out of synchronism by more than the limit of error allowed by the construction of the mechanism, is true only in a theoretical sense. Most of the time, owing to inertia and the slippage of the clutches feeding the record, the feeding motion is only retarded, and when the body and record come into unison, the retarding action of the clutches is changed to one of driving.

Now consider again the position of the arms as shown in Fig. XI, and the first perforation in Fig. V just over the tracker duct $d^9$. If the carriage should run away from the record and pass through the neutral position, that is when it brings arm 46 over the active opening and beyond, the arm 45 will come in contact with port $g^9$, opening the exhaust through arm 45, chamber 50, and exhausting cylinder 33, through the tube 7, thereby sending the carriage in the reverse direction, bringing the arm 46 over port $q^9$. The neutral circuit is thereby opened to the exhaust. Then as the next perforation comes into line with its tracker ducts, the machine takes up its normal travel.

If the drive should lag behind or run away from the record entirely, no arm would be in circuit with the selector ports connected with the exhausts. In this condition no air flows through either the valve $81^a$, $81^b$, $81^c$ or from the cylinder 33, and the record will stop. If the piston 32 should have been held to one side before the runaway the pressure will soon be equalized on both sides through its leak hole and the machine will stop. In order to start the machine now, the parts must be brought into proper position by hand. In order to locate the position of the various parts of the machine for the corresponding position of the record, the position of the various unit elements will be marked on the record at stated intervals to correspond with marking on the machine. The function of the arm 44 is similar to that of arm 48, except it is for motion in the opposite direction.

The diagram shown in Fig. XI, is for one unit element. In this machine there are three unit elements controlling the motion of a tool, there being two tools there is a total of six unit elements controlled simultaneously by one record. In order to have each unit element control the feeding of the record, and to have the record stopped in case any one of the unit elements are not working properly, there are six cylinders 81, 82, 83, 84, 85, 86 provided, one for each unit element. They are all similar to the cylinder 81, and are each provided with three valves similar to $81^a$, $81^b$ and $81^c$ and are similarly controlled. Each cylinder 82, 83, etc., controls a rod similar to 171 and are all in circuit in tube 88, so that in order to have the record feed, each one of the cylinders 81, 82, 83, 84, 85 and 86 must be actuated.

In the description I show one type of cylinder actuated by the record perforations viz. cylinders $c^1$, $c^2$, $c^3$, etc., to control the flow through certain tubes. The cylinders 61, 62, 92 and 81 with their corresponding rods perform analogous functions. Either type may be substituted for the other. I use both types to show that either one may be used.

In the description above, it was shown how the record controlled the pressure on both sides of a piston. The variation of these pressures was assumed to drive the unit element backward, forward, or not at all (neutral position.)

That the carriage is driven backward or forward or stopped in immediate accordance with the variation of these pressures is assumed for the purpose of illustration. In reality owing to inertia and other factors inherent in the mechanism, the motion of the carriage does not always respond to the position of the piston, the changes in the position of the piston taking place more rapidly than corresponding changes in the motion of the carriage. This has the advantage of steadying the motion of the carriage, effecting smoothly running motion and gradual changes of speed and direction.

The details of the longitudinal carriage will now be described, to show how the above mentioned results are obtained. Referring to Figs. I, II, III, XIII and XIV, the table 196 is provided with V ways 2 on each side of the table and running its length. The longitudinal carriage 1, is provided with two shoes 12 at the bottom, which slide over the V ways 2. The gears 127 and $127^a$, attached to the carriage 1, engage with the two racks 14, running the length of the table. It is evident that if the gears 127 and $127^a$ rotate in one direction, the carriage will move, say, in a forward direction, and if the gears rotate in the opposite direction, the carriage will move in a backward direction. It will now be necessary to trace the relation between the movement of the piston in the controlling cylinder and the gears 127 and $127^a$.

Referring to Fig. XIV the motor 27 supplying the power for this machine is directly connected to shaft $27^a$, and is properly supported on the frame work of the carriage. The gear 35 is fixed to shaft $27^a$ and engages with gear 36. The gear 36 transmits its motion to shaft 37 to which it is fixed. The hollow shaft $37^a$ has an inside diameter large enough to fit over the shaft 37. A feather on the shaft 37 engages with a slot in shaft $37^a$, so that they both rotate together, but the hollow shaft $37^a$ is capable of sliding over the shaft 37. 113, consisting of two female parts of a friction clutch, is fixed to the shaft $37^a$. 114, the male portion of the clutch is fixed to gear 116, but both fit loosely over the shaft $37^a$. They are held laterally by the frame 142. The male portion of the friction clutch on the other side, 115, is similarly fixed to gear 117, they also fit loosely over the shaft $37^a$, and are held laterally by the frame 143.

I do not limit myself to the type of clutch here described. Many forms of clutches capable of reversing the motion transmitted and transmitting no motion if desired, controlled by the position of the piston, could be used for the unit elements.

The cylinder 141 is placed so that its piston 140 is attached to the end of the shaft $37^a$. The box $141^a$ contains the valves and cylinders regulating the pressure in the cylinder 141. These are similar to the cylinders 61, 62, 92, and valves 111, 165, 167 and 168 shown in Fig. XI. When the piston 140 is held at the end of the cylinder as shown in Fig. XIII, the clutch 113 will engage with 114, and drive the gear 116, as the shaft 37 is rotated. If the piston 140 is forced to the other end, the clutch 113 engages with its mate 115, and consequently drives gear 117. If the piston 140 is forced to neither end of the cylinder, the clutch 113 does not press against either of its mates 114 or 115, and therefore neither gear is driven by it.

141 is one of the control cylinders, noted before in describing the controlling mechanism. The position of the piston 140 is controlled by the record.

When the clutch 114 is thrown in, the gear 116 drives the gear 118 which is fixed to the shaft 128, which in turn revolves in bearings in frame 146. The gear 129 is rigidly attached to the end of shaft 128 and in turn drives gear 130 and the shaft 131 to which the gear 130 is fixed. The shaft 131 revolves in suitable bearings in the frame, and drives the bevel gear 132 which is fixed to it. The bevel gear 133 mates with the bevel gear 132. The bevel gear 133 is fixed to gear $133^a$ or both are made of one piece and are fixed to shaft $134^b$ to which the gear 134 is fixed. The gear 134 drives gear 127 which revolves on shaft 231, which is attached to the frame. The gear 127 engages with the rack 14 and thus drives the longitudinal carriage.

The gear $133^a$ drives the gear 135 being in turn fixed to shaft 138 which extends for the width of the carriage. The gear $135^a$ is fixed to the other end of the shaft 138 and in turn drives gear $133^b$ and the shaft $134^c$, to which it is fixed. The gear $134^a$, fixed to shaft $134^c$, drives gear $127^a$ which in turn engages with rack 14 and drives the longitudinal carriage. It will be noted that the gears 127 and $127^a$ rotate in the same direction at the same time and at the same speed and therefore the carriage is driven forward at both sides of the table simultaneously.

When the clutch 115 is thrown in, the gear 117 drives the gear 119, which is fixed to shaft 120. The gear 121, attached to the shaft 120, in turn drives gear 122. The shaft 123 to which the gear 122 is fixed, drives the bevel gear 124 which is attached to same. The bevel gear 125 mates with the gear 124. The gear 125$^b$ is fixed to the bevel gear 125, or both are made of one piece, and both are fixed to shaft 126$^a$. The gear 126 is fixed to the shaft 126$^a$, and in turn drives gear 127 which engages with rack 14, and therefore the longitudinal carriage is driven in opposite direction to that when the clutch 114 was engaged with its mate 113. The gear 125$^b$ drives the gear 136, which is fixed to shaft 137. The shaft 137 runs for the width of the table parallel to the shaft 138. At the other end of the shaft 137, the gear 136$^a$ is attached, and in turn drives gear 125$^a$. Gear 125$^a$ is fixed to the same shaft as gear 126$^b$ (not shown because it is behind gear 134$^a$) and in turn, it drives the gear 127$^a$, which engages with rack 14, and transmits motion to the carriage opposite to that when the clutch 114 is thrown in. As noted before, gears 127 and 127$^a$ both drive the carriage. 139 is the selector for the longitudinal carriage, and is similar in construction to the one described in Figs. XIII and XIV. It is fixed to the frame of the carriage, while its five arms are fixed to shaft 232 and hence rotate in the same direction as this shaft. It is therefore evident that when the carriage moves in one direction, that the arms will rotate one way. When the carriage moves in the opposite direction, the arms will rotate in the opposite direction, and when the carriage is stationary, the arms will be stationary. These were assumptions made in describing the controlling mechanism.

In the drawing and description, the arms of the selector are shown connected directly to the shaft to which the driving gear 127$^a$ is attached. It was shown that way for simplicity of drawings and explanation. In the preferred form the arms will be attached to a train of gears, so that for any motion of the shaft 232, the arms will travel more rapidly.

144, 145, 146 and 147 are parts of the frame, containing the bearing of shafts, and are used for bracing the machine. In order to transmit the motion from the motor 27 to the transverse carriage which is mounted on the channel 4 of the longitudinal carriage, its flanges being planed to form V shaped guides similar to the V ways 2 for the longitudinal carriage, the bevel gear 38 is fixed to shaft 37, which is in constant motion when the motor 27 is running. The mating gear 39 is attached to shaft 40, revolving in bearings in frames 146 and 147. The shaft 40 drives the bevel gear 41 fixed to it, and in turn the bevel gear 41 drives its mate 42 which is fixed to horizontal shaft 21 and drives it. The shaft 21 furnishes the power for the motion of the transverse carriage, and for the slope motion and extends for the width of the longitudinal carriage and is provided with a slot 233.

Referring to Figs. XV, XVI, XVII, the gear 22 fits loosely over shaft 21 and is held by a key 234, so that the gear 22 can slide over the shaft 21, but is made to rotate with it. The gear 22 is held in place by a forked guide frame 170 which in turn is attached to the body of the transverse carriage. As the carriage travels over the ways of 4, the gear 22 slides along the shaft 21 and is caused to revolve by same. Gear 23 is driven by gear 22, and is also attached to frame 170. Gear 24 is driven by gear 23 and fits over shaft 31, thereby causing shaft 31 to rotate. The shaft 31 revolves in bearings of frame 34, and at one end of same, the piston 32 of the cylinder 33 is attached. The box 33$^a$ incloses the cylinders and valves 61, 62, 92, 111, 165, 167 and 168 shown in Fig. XI. The female part of a friction clutch 25 is fixed to the shaft 31, as is also the female part of another friction clutch 19. The male part of the friction clutch 26, mating with the clutch 25 is fastened to the bevel gear 29. The bore of both is such that they will fit loosely over shaft 31. The bevel gear 29 and the clutch 26 are held in place by the frame 34. The male portion of the friction clutch 20, the mate of 19, is fastened to the bevel gear 28, and both fit loosely over shaft 31. They are held in place by the frame 34$^a$. The frame 34 and 34$^a$ are braced by the plate 34$^b$. The bevel gear 30 fixed to shaft 43 mates with both gears 28 and 29. When the piston 32 is held in the position shown, the clutches 25 and 26 are engaged, and shaft 31 drives gear 29, which in turn drives the gear 30. The gear 28 is driven by 30. If the piston 32 is forced to the other end of the cylinder, the shaft 31 is moved laterally, the clutches 25 and 26 are disengaged, and the clutches 19 and 20 are engaged, driving the bevel gear 28 which in turn drives the bevel gear 30, in the opposite direction. 20 is now the driven gear. Since the gears 28, 29 and 30 are always in contact, when the direction of motion is reversed, backlash is eliminated. When the piston 32 is forced to neither end of the cylinder 33, both clutches are disengaged and the gears 28, 29 and 30 are not driven by the shaft 31. The cylinder 33 is similar to the one described in the typical control cylinder, and shown in diagram Fig. XI. The gear 17 is fixed to shaft 43 and is driven by same. The gear 17 engages with rack 15 which is attached to channel 4, and runs the width of the longitudinal carriage as shown in Fig. I. As gear 30 is driven in either direction, gear 17 is driven in the same direction, and consequently the frame 3, to which the shaft 43 and the frame 34 are attached moves back and forth over the ways of the channel 4. The selector 18 constructed as shown in Figs. XIII and XIV is attached to the frame 3. The five selector arms are all attached to shaft 43 and rotate with it.

To transmit motion from shaft 21 to the axial or slope component, the gear 148 is feathered to shaft 21, and is made to rotate with same by means of key 235, in the same manner as gear 22. The gear 148 is held in place by the forked frame 188. The gear 148 drives gear 149 which in turn transmits its motion to shaft 152. The shaft 152, revolving in suitable bearings is attached to the piston 151 of the cylinder 150. The box 150ª incloses the valves and cylinders controlling the pressure in the cylinder 150 as explained before in connection with box 33ª. The female part of a friction clutch 161 is attached to end of shaft 152, and the female part of another friction clutch 153 is attached to shaft 152 near gear 149, as shown. The mating male parts of these clutches 160 and 154 are fastened to the bevel gears 159 and 156 respectively. The gear 159 and the male clutch part 160 fit loosely over shaft 152, and are held in place by frame 190. The male clutch part 154 and gear 156 also fit loosely over shaft 152 and are held in place by frame 155. The bevel gear 157, attached to the vertical shaft 166 mates with both bevel gear 156 and 159 and is driven by either one. When the piston is forced to the position shown in Fig. XVI, the clutch 153 engages with its mating part 154 and the bevel gear 156 and will then drive the bevel gear 157 while the bevel gear 159 will be driven by the bevel gear 157. If the piston 151 is forced to the other end of the cylinder 150, the clutch part 153 and the clutch part 154 will become disengaged while the male clutch part 160 will become engaged with its mate 161, since the rotation of shaft 152 is always in the same direction, the bevel gear 159 will now drive the bevel gear 157 in the opposite direction to that which it was driven before and the bevel gear 156 will be driven. Since the teeth of the bevel gear 156, the bevel gear 159 and the bevel gear 157 are always in contact, there is no backlash when the direction of motion is reversed. When the piston 151 has equal pressure on both sides, both clutches become disengaged and the shaft 152 will rotate without driving the bevel gear 157 in either direction. The cylinder 150 is the control cylinder for the slope, or axial component and is similar to 33 of Fig. XI. The shaft 166 revolves in bearings in frame 189 and in the frame 3. It is held in proper position by collar 236. The gear 158 is fixed to shaft 166, and transmits its motion to gear 162, which is attached to the tool piece 172 and rotates it. The tool piece 172 revolves in the supporting shell 177 which is fastened to the frame 3 by means of frame 179 and is moved along with it.

The piece 172 to which the tool is attached below can rotate inside of the supporting shell 177. The selector 163, similar to the one used for the other component motions, is attached to the frame 3. Its five arms are attached to the tool piece 172 and revolve with it. The tool 173 is attached to piece 172 by means of the adjusting screws 182, 183, 184 and 185. The edge of the tool 173 can be made to coincide with the vertical axis of the piece 172 by adjusting it with the said screws. The rotation of the gear 162, brings the edge of the tool at the proper angle for entering the work.

The shafts 37ª, Fig. XVIII, 152 and 31, Fig. XVI whose longitudinal movements control the engagement of the clutches driving the unit elements are separated into two parts, their joints being at 197, 198, and 13, respectively. The adjacent ends of each shaft are upset. Over the heads thus formed a split sleeve is bolted. At 152, the upper half of the sleeve is shown removed. The object of dividing the shafts is to prevent undue rotation of the pistons attached to the ends of these shafts in their cylinders.

The sequence of operation of the machine is as follows:—Let the shapes 11 Fig. IV form the path over which it is desired to have the tool pass. The machine is set at the starting point. The record which has been previously prepared for the desired path by a method which will be described hereinafter, is placed on the roller 74, and its end is attached to spool 75 by means of any ordinary catch, and is passed between rollers 54 and 78. The record is so made that it will control the three component motions simultaneously. The motors are started and the clutch 93 is thrown to the right. As the record is fed, the three controlling cylinders are actuated and the longitudinal carriage begins to travel in the path desired as prepared on the record. The transverse carriage being placed on the longitudinal carriage, is carried back and forth with it and simultaneously has a transverse motion on the runways of the channels 4, due to its controlling cylinder. The resultant direction of motion of the tool which is attached to the transverse carriage, is the resultant of the paths of the longitudinal and transverse carriages. The control of the axial motion meanwhile, keeps the tool 173 at the proper slope. As the tool enters at 11, it travels along the dotted line until it reaches the position indicated for piece 11ª. The tool then follows the direction indicated by the arrows around the shape 11ª, it being controlled by the simultaneous action of the three component motions and their actuating cylinders. After passing completely around the shape 11ª, the tool reaches the position shown at the shape 11ᵇ, and follows the direction of the arrows until it has passed over the shape 11ᵇ, and then follows the direction shown, until the shape 11ᶜ is passed over, etc.

By adding unit elements to those already described as mentioned in the earlier part of this specification, motion can be had in all directions in space, and the axis of rotation can be tilted at various angles. For example, let it be desired to carry a tool through space and have it rotate about an axis of varying inclination, and let the tool be carried about on the transverse carriage 3. Referring to Fig. XVI it is obvious that by adding a unit element for motion in a vertical direction to the transverse carriage 3, providing vertical ways for the tool to travel up and down between, a tool traveling along with the carriage, and able to move in a vertical direction can be made to traverse a given path in space. The tool can be fitted between the vertical ways to allow rotation about a horizontal axis, and this horizontal axis can be so supported that it can be made to revolve about a vertical axis. Corresponding perforations, tracker ducts, selectors, etc., must be provided, a set for each axis of rotation.

The tool 173 shown on Fig. XVII is an adaptation of the cutting blade 173 used in Fig. XVIII of my application, Serial #737,072. It is used in the present application only for diagrammatic purposes.

On Figs. XV, XVI and XIX, the selectors 18, 163, and 139, are indicated with only a few tubes leading from them, to avoid obscuring other lines of the drawing.

The mechanism herein described embodies my preferred form. There are however, several modified forms of it which may be advantageously used.

The method of control described above is best adapted to that case where the distance between tracker-board and the selectors is not too great. Where this distance is too great the tubes running from the tracker board to selector become too long and unwieldly, and the changes in pressure in the various cylinders too slow. For such a case the following alternative method shown diagrammatically in Fig. XXV can be used.

In the alternative method the selectors used are the same as those used in the method described before. The tubes 266, 267, 268, 269 and 270 corresponding to the tubes 6, 7, 8, 9 and 10 of the first method lead off from their selector arms as before to the cylinder 33 controlling the action of the driving clutches. But the branch tubes 69, 96ª and 64 leading to cylinder 81 controlling the feed of the record are replaced by tubes 271, 272 and 273 leading to cylinders 274, 275 and 276 respectively. These cylinders are located near the selector. One of these cylinders 276 is shown in section, the other two are similar in construction. When any of the selector arms 45, 46 and 47 is connected to the exhaust, the piston of its corresponding cylinder 274, 275 or 276 is moved in, drawing with it the electrical conducting piece 274ᶻ, 275ᶻ or 276ᶻ against its corresponding terminals 274ˣ and 274ʸ, 275ˣ and 275ʸ or 276ˣ and 276ʸ. Whenever the gap between any pair of these terminals is closed a current is sent through the solenoid 277 from the source T, considering for the moment that the gap W in wire 279 is closed. The solenoid 277 replaces cylinder 103 used in the method described before, its plunger 278 corresponds to the piston 102. When a current flows through the solenoid 277 the record is fed. The position of the plunger 278 controls the feed of the record just as did the piston 102 before. The diagram is shown for one unit element. If there are additional unit elements acting together with the one shown, each unit element has a group of three cylinders corresponding to cylinders 274, 275 and 276 with their respective conducting pieces $z$ and terminals $x$ and $y$. A gap W in wire 279 is provided for each additional unit element. The branch wire 280 leads to the $x$ terminals and the branch wire 281 to the $y$ terminals. Hence for the record to feed at least one pair of terminals (of the group of three pairs for each unit element) must be connected to each other by their conducting piece $z$. For the record to feed each selector must have its arms in the proper relation to the active selector ports as described before in connection with tube 88.

The perforated record sheet passes over the openings of the tracker ducts U¹, U², etc. The ducts U¹, U², etc., lead to cylinders $e'^1$, $e'^2$, etc., respectively. A detail of one of these cylinders is shown in Fig. XXVII. The tubes V¹, V², V³, etc., lead to the exhaust R through pipe R'. When a perforation of the record passes over the opening of one of the tubes U, say U¹, it forces up the piston of $e'^1$ carrying with it the electrical conducting piece 282. This piece closes the gap between its corresponding wires $a'^1$, $b'^1$ sending a current around wire 283 through solenoid S¹ from the source T. A detail of the solenoids S¹, S², etc., is shown in Fig. XXVI. The plunger 284 moves the piston 285 so that the groove 286 comes opposite tubes $a$ and $b$. This connects the exhaust P with $a$, in the particular case referred to, exhaust P is connected with $a^1$ which leads to port $q^1$ of the selector. The port $g^1$ is then the active port. If the perforation of the record were over tracker duct $U^7$, $q^7$ would be the active port and the exhaust would act through selector arm 45.

I do not limit myself to the types of cylinders shown.

In the machine, the cylinders $c'$ and their ducts are located near the tracker board. The cylinders $r$ and their tubes are located near the selector. Instead of long tubes from near the tracker board to the selectors there are now cables of electric wires. In this alternative method the tracker ducts and cylinders could be dispensed with. The record can be made to close the gap between the terminals $a'$ and $b'$ more directly. In my application, Serial #737,072 one method of doing this by an embossed record was shown. Another way which could be used both in my application Serial #737,072 and in the alternative method shown here, is shown in Fig. XXVIII. A perforated record is used. The upper end of the trailer 287 is pulled up by the spring 290. The trailer 287 is pivoted about a rod 291. When there is no perforation of the record under the point of the trailer 287, the record holds up the point from sinking into the groove 292. The upper end of the trailer which is electrically conductive, is kept away from the terminals of wires $a''$ and $b''$ corresponding to terminals $a'$ and $b'$ of Fig. XXVII. When a perforation comes under the point of the trailer, the point drops into the groove 292 thereby closing the circuit between terminals $a''$ and $b''$.

The mechanism for making the record will now be described. It is shown here as a separate machine for the sake of clearness in the drawings, but it could just as well have been combined into one machine with the operating mechanism as shown in my application Serial #737,072.

The method of procedure in making the record is as follows: A sheet of paper or other material upon which the desired path of the tool is shown, is spread upon the table 196. A pointer or recording tool is then inserted into the piece 172 instead of the tool 173. The person recording then guides the pointer over the outlines of the figures marked, holding it at the desired angle to the path, thereby causing the machine to describe the path which it afterward reproduces in the process of performing its functions. In the general case, the unit element is made to traverse the path with the desired speeds, being guided by external means, that it is afterward to follow when the record is used. In making the record, a blank sheet of record paper or other material is passed over the tracker board, and by means which will now be explained, a series of punches are actuated and punch the perforations in the record sheet.

Referring to Figs. XX, XXI, XXII, XXIII and XXIV, the plate 178 is provided with a series of openings $h^1$, $h^2$, $h^3$, etc., corresponding to tracker ducts $d^1$, $d^2$, $d^3$, of the operating mechanism. A series of punches $q^1$, $q^2$, $q^3$, etc., are placed so as to fit into openings $h^1$, $h^2$, $h^3$, etc., and into a die plate having a series of openings, $k^1$, $k^2$, $k^3$, etc. Each one of the punches $q^1$, $q^2$, $q^3$, etc., has its lower end enlarged and provided with a groove as shown at 180. The bar 181 capable of reciprocation in the piece 288 has a pin 186 fitting into the slot 180. The piece 288 is fixed to the piston 174 in the cylinder $j$ moving with it. When the bar 181 is reciprocated it will cause the punch $q$ to reciprocate, the slot 180 at the same time permitting the bar 181 to be moved laterally. 191 is a rock shaft to which a series of levers 192 are attached. Through bar 193 the rock shaft 191 will impart a reciprocating motion to the plate 175. The arm $181^a$ of bar 181 is adapted to engage with the recess in plate 175. The cylinder $j$ is connected by means of tube $m$ to a selector port $g$ and by tube $n$ to the exhaust chamber 237. The piston 174 is normally in the position shown and held there by spring 187, the pressure on both sides of the piston being equalized through its leak hole. If now the tube $m$ be opened to the atmosphere, the piston 174 is pushed in and thereby the lug $181^a$ engages with the recess in plate 175, which reciprocates at intervals equal to the time it takes the record to be fed forward a predetermined distance and the punch $q$ is actuated.

In this machine there are sixteen tracker ducts for each unit element, therefore in the recording apparatus there are sixteen punches $q^1$, $q^2$, $q^3$, etc., sixteen cylinders $j^1$, $j^2$, $j^3$, etc., sixteen bars 181 and sixteen reciprocating plates 175 for each unit element, all actuated by the rock shaft 198. The tubes $m^1$ $m^2$, $m^3$, etc. leading from cylinders $j^1$, $j^2$, $j^3$ etc. lead to the ports $g^1$, $g^2$, $g^3$ etc. of the selector. The operating selectors are replaced by recording selectors. The recording selector has only one arm which opens to the atmosphere. Fig. XXII shows a section through a recording selector. The selector arms of the operating selector are here replaced by the opening 238 in the disk 239 and the ring 64' which is fixed to disk 239. When the carriage is moved back and forth, the opening 238 moves back and forth over the ports $q$, the disk 239 being fixed to the shaft of the driving gear, as shaft 43 for the transverse motion. When the opening 238 comes opposite any port $q^1$, $q^2$, etc. its corresponding tube $m$ is opened to the atmosphere which actuates its corresponding cylinder $j$ and punch $q$.

Referring to Fig. XX, the motor 176 supplies the power to feed the record 73 and to operate the bellows 226. The shaft 228 is driven by the motor 176 through belt 194 and pulley 149ª. 229, a mating part of a clutch is attached to the sprocket wheel 289 and both are loose on shaft 228. 240, the sliding part of this clutch is feathered on shaft 228 and when engaged with part 229 will drive spool 241 when record sheet is to be rewound. 242, a part of a clutch similar to 229 and adapted to engage with the sliding part 240 is fixed to a worm 243. The clutch part 242 and the worm 243 are loose on shaft 228. 246 is the worm wheel meshing with the worm 243. When the sliding part 240 is engaged with its mating part 242, the worm wheel 246 is driven. The bevel gear 247 is fixed to worm wheel 246 rotating with it. The bevel gear 248 attached to shaft 249 is driven by its mating gear 247. The record feed roller 250 is fixed to shaft 249 and is similar to the corresponding roller 54 on the operating machine. The gear 251 fixed to shaft 249, drives gear 252 which in turn drives the take up spool 253. 254 is part of a clutch, fixed to gear 255 both being loose on shaft 228. 256 the sliding part of this clutch is feathered on shaft 228 and is thrown in engagement with the clutch part 254 by means of lever 257. When thrown, lever 257 is held in place by piece 258. Gear 255 drives gear 259 which in turn drives crank shaft 260 and thereby the exhaust bellows 226 are operated. The cam 261 shown in detail in Fig. XXI is fixed to shaft 228. One end of the rod 262 is provided with a friction roller which works in the groove 263 of the cam, the other end is connected by means of a pin to crank 264 which is fixed to rock shaft 191. The rod 262 sliding in the pivoted frame 265 causes shaft 191 to rock for the purpose explained above.

Referring now to the control selector shown in Fig. XIII and the diagram Fig. XI, I do not limit myself to the number of selector arms shown nor the particular arrangement of valves, tubes and cylinders in connection with these arms. By varying the number and arrangement of the selector arms the manner of control of the travel of the body can be varied. In addition there may be selector arms which do not control the travel of the body. These additional arms can have an arrangement of valves, tubes and cylinders connected with them, so that whenever they come over an active port of the selector, special mechanisms, controlled by the cylinders connected to these arms, will perform a given function. Instead of there being just a single line of perforations for each unit element, supplementary perforations can be used, abreast of the regular perforations controlling travel, which will operate the additional selector arms. A use of this would be in the case where a moving carriage carries a tool about, and at a particular instant it is desired to lift the tool from the work. Supplementary perforations could then be used to connect through an additional selector arm to a cylinder actuating mechanism for lifting the tool.

The terms "marked, markings, marking, marks and mark" as used in the appended claims are to include the idea of perforation.

Having thus fully described my invention, I claim as new, and wish to secure by Letters Patent:—

1. A device of the character described, comprising, a body suitably mounted to have motion, mechanism for causing said motion, a chamber, a piston in the said chamber adapted to control the said mechanism causing the motion of the body, a source of fluid pressure, a record marked in accordance with the desired speeds and directions of motion in combination with means controlled by the joint action of the record and the motion of the body for controlling the transmission of the said fluid pressure to the said chamber, whereby the speed and direction of the motion of the body are controlled by the record.

2. A device of the character described, comprising, a body suitably mounted to have motion, mechanism for causing said motion, a chamber, a piston in the said chamber adapted to control the said mechanism causing the motion of the body, a source of fluid pressure, a record marked in accordance with the desired successive directions of motion in combination with means controlled by the joint action of the record and the motion of the body for selecting the paths followed by the said fluid pressure to the said chamber in such manner, whereby the motion of the body is controlled by the record.

3. A device of the character described, comprising, a body suitably mounted to have motion, mechanism for causing said motion, a chamber, a piston in the said chamber adapted to control the said mechanism causing the motion of the body, a source of fluid pressure, a record perforated in accordance with the desired speeds and directions of motion in combination with means controlled by the joint action of the record and the motion of the body for controlling the transmission of the said fluid pressure to the said chamber, whereby the speed and direction of the motion of the body are controlled by the record.

4. A device of the character described, comprising, a body suitably mounted to have motion, mechanism for causing said motion, a chamber, a piston in the said chamber adapted to control the said mechanism causing the motion of the body, a source of fluid pressure, a record perforated in accordance with the desired speeds and directions of motion a series of tracker ducts, means for controlling the transmission of the said fluid pressure to the said chamber, the said means controlled by the relative movement of the record and tracker ducts and by the motion of the body, whereby the speed and direction of the motion of the body are controlled.

5. A mechanism comprising, a body suitably mounted to have motion, pneumatically controlled mechanism for causing motion of the body in reversible directions, a record marked in accordance with the desired successive directions of motion for the body, a selector, suitably constructed to control the flow of air to the said pneumatically controlled mechanism, comprising two parts adapted to have relative motion with each other in a fixed relation to the motion of the body, adapted by the relative position of the said two parts to cause actuation of the said pneumatically controlled mechanism for motion of the body in the forward direction when the position of the body is behind that called for by the record and in the backward direction when its position is ahead.

6. A device of the character described, comprising, a body suitably mounted to have motion, mechanism for causing said motion, a chamber, a piston in the said chamber adapted to control the said mechanism causing the motion of the body, a source of fluid pressure, a record marked in accordance with the desired successive directions of motion, in combination with means for connecting the said fluid pressure source through a plurality of paths to selecting means, the said selecting means, adapted to transmit the said fluid pressure from any of said paths to the said chamber in accordance with whether the body is ahead or behind at any time of the position called for by the record in such manner, whereby the said piston controls the motion of the body.

7. A device comprising, a source of fluid pressure, a body suitably mounted to have motion, mechanism for controlling the said motion, a record marked in accordance with the desired directions of motion in combination with means for connecting the said source to a plurality of tubes corresponding to predetermined positions of the body in the succession called for by the marking of the record, the said tubes, selector arms, each arm having an opening through it, adapted to have relative movement with the ends of the said tubes in a fixed relation to the motion of the body, the said selector arms adapted, while registering with a tube connected to the source, to connect the source to the mechanism controlling the motion of the body in such manner, whereby the motion of the body is kept to that called for by the record.

8. A device comprising, a source of fluid pressure, a body suitably mounted to have motion, a record of motion in combination with means for connecting the said source to a plurality of tubes in the succession called for by the marking of the record, the said tubes, selector arms, each arm having an opening through it adapted to have relative movement with the ends of the said tubes in a fixed relation to the motion of the body, each selector arm adapted, while registering with a tube connected to the source, to cause motion of the body in the particular direction predetermined for the selector arm.

9. A device comprising, a body suitably mounted to have motion, a plurality of tubes, any two consecutive tubes corresponding to adjacent positions of the body upon the unit-element, a record marked in accordance with the desired directions of motion of the body, having its marks in suitable order to cause the said tubes to be made actuating tubes in consecutive succession, selecting means suitably constructed to have relative movement with the ends of the said tubes in a fixed relation to the motion of the body, adapted to send the body backward or forward depending upon whether the body is ahead or behind, at any instant of the position called for by the record at the corresponding instant.

10. A device comprising, a body suitably mounted to have motion, a plurality of tubes, any two consecutive tubes corresponding to adjacent positions of the body upon the unit-element, a record of motion having marks in suitable order to cause the said tubes to become actuating tubes in accordance with the speed desired for the body, the said record having groups of marks in immediate succession corresponding to the same tubes, whereby any of the said tubes at various times are caused to remain actuating tubes for prolonged intervals, all the marks of the record being spaced close enough together in the direction of feed of the record so that there is always at least one actuating tube at every instant for a unit element, selecting means, suitably constructed to have relative movement with the ends of the said tubes in a fixed relation to the motion of the body, for controlling the motion of the body, the speed of the body depending thereby on the frequency of recurrence and the lengths of the said prolonged intervals.

11. A device comprising, a source of fluid pressure, a body suitably mounted to have motion, mechanism for controlling the motion of the body by the flow of the said fluid through a part of said mechanism, a record of motion in combination with means for connecting the said source to a plurality of tubes in the succession called for by the marking of the record, the said tubes, selector arms, each arm having an opening through it, adapted to have relative movement with the ends of the said tubes in a fixed relation to the motion of the body, one of said selector arms adapted to actuate the mechanism controlling the motion of the body in such manner whereby no motion is imparted to the body by said means, the rest of said selector arms adapted to cause motion of the body, an arrangement of tubes connected to the said selector arms whereby each selector arm, while registering with a tube connected to source, causes a particular state of flow of the fluid through the said part of the mechanism controlling the motion of the body and thereby the motion of the body is controlled in the particular manner predetermined for the selector arm.

12. A device comprising, a source of fluid pressure, a body suitably mounted to have motion, mechanism for controlling the motion of the body by the flow of the said fluid through a part of said mechanism, a record of motion in combination with means for connecting the said source to a plurality of tubes in the succession called for by the marking of the record, selector arms, adapted while registering with a tube connected to source to transmit the fluid to the said part of the said motion controlling mechanism, each arm having an opening through it, adapted to have relative movement with the said ends of the said tubes in a fixed relation to the motion of the body, one of said selector arms adapted by its connections to cause motion of the body in one direction, another of said selector arms adapted by its connections to cause motion of the body in the opposite direction and another adapted by its connections to actuate the mechanism controlling the motion of the body in such manner whereby the driving action on the body is suspended.

13. A mechanism of the character described, comprising a source of fluid pressure, a body suitably mounted to have motion, a record of motion in combination with means for connecting the said source to a plurality of tubes in the succession called for by the marking of the record, the said tubes, selector arms, each arm having an opening through it, adapted to have relative movement with the ends of the said tubes in a fixed relation to the motion of the body, some of said selector arms adapted to cause motion of the body in one direction, others of said selector arms adapted to cause motion of the body in the opposite direction, each of the said selector arms adapted, while registering with a tube connected to source, to cause motion of the body in the particular direction predetermined for the selector arm.

14. A mechanism comprising a body suitably mounted upon a plurality of mountings, adapting it to have simultaneously translation in all directions and rotation through variable angles in reversible directions, the said plurality of mountings, each mounting for a component motion of the body, a source of fluid pressure, a record of motion in combination with means for connecting the said source to a plurality of sets of tubes in the succession called for by the marking of the record, the said sets of tubes, a set for each of the said components of the motion of the body, a plurality of sets of selector arms, each selector arm having an opening through it, a set of selector arms for each of the said sets of tubes, each set of selector arms adapted to have relative movement with the ends of its respective set of tubes in a fixed relation to its corresponding component motion of the body, each selector arm adapted to control the motion of the body along its corresponding component, while registering with a tube connected to the source.

15. A device of the character described, comprising, a body suitably mounted to have motion, a source of power, mechanism adapted to transmit the said power in reversible directions from the power source for the motion of the said body, means for controlling the said mechanism, a source of fluid pressure, a record marked in accordance with the desired speeds and directions of motion in combination with means for transmitting the said fluid pressure to the means for controlling the action of the power transmitting mechanism in such manner, whereby the speed and direction of the motion of the body are controlled.

16. A device of the character described, comprising, a body suitably mounted to have motion, a source of power, mechanism adapted to transmit the said power in reversible directions from the power source for the motion of the said body, a chamber, a piston in the said chamber adapted to control the said power transmitting mechanism, a source of fluid pressure, a record marked in accordance with the desired speeds and directions of motion in combination with means for transmitting the said fluid pressure through the said chamber in such manner, whereby the speed and direction of the motion of the body are controlled.

17. A device of the character described, comprising, a body suitably mounted to have motion, a source of power, clutches adapted to transmit the said power in reversible directions from the power source for the motion of said body, means for controlling the action of the said clutches, a source of fluid pressure, a record marked in accordance with the desired successive directions of motion in combination with selecting means for transmitting the said fluid pressure to the means for controlling the action of the clutches, the said selecting means comprising two parts adapted to have relative motion with each other in a fixed relation to the motion of the body, adapted by the relative position of the said two parts to cause engagement of the clutches for motion in the forward or backward direction depending upon whether the body is behind or ahead of the position called for by the record at any time.

18. A mechanism comprising a body suitably mounted to have motion, a chamber having a plurality of ports, a piston in said chamber adapted to control the motion of the body, a source of fluid pressure for actuating the said piston, a record marked in accordance with the desired successive directions of motion in combination with means for connecting the said source to a plurality of tubes in the succession called for by the marking of the record, the said tubes, selector arms, adapted while registering with a tube connected to the source to control the pressure in the said chamber, each arm having an opening through it, adapted to have relative movement with the ends of the said tubes in a fixed relation to the motion of the body, the particular connections of each arm to the ports of the said chamber determining the manner of control adapted to be exercised by the said arm upon the motion of the body.

19. A mechanism comprising a body suitably mounted to have motion, a source of power, clutches adapted to transmit the said power in reversible directions from the power source for the action of the body, means for controlling the action of said clutches, a plurality of tubes, selector arms, each arm having an opening through it, adapted to have relative movement with the ends of the said tubes in a fixed relation to the motion of the body, a source of fluid pressure, a record of motion in combination with means for connecting the said source to the tubes in the succession called for by the marking of the record, each selector arm, while registering with a tube connected to the source, adapted by its connections to the clutch controlling means to control the motion of the body in a particular manner.

20. In a mechanism of the character described, a selector, comprising, a plurality of tubes connected to a corresponding series of ports, a plurality of compartments and a plurality of selector arms, each arm having an opening through it, one end of the said opening adapted to register with any of the said ports, the other end of the said opening being connected to a corresponding compartment, the said selector arms adapted to have relative movement with the said ports, whereby any tube can be connected to any compartment by the relative movement of the said selector arms and the said ports.

21. In a mechanism of the character described, a selector, comprising, a plurality of tubes connected to a corresponding series of ports arranged in a ring, a plurality of compartments and a plurality of selector arms, each arm having an opening through it, one end of the said opening adapted to swing around the said ring of ports and to register with any of the said ports, the other end of the said opening being connected to a corresponding compartment, whereby any tube can be connected to any compartment by the rotation of the selector arms.

22. In a mechanism of the character described, a selector, comprising, a plurality of tubes connected to a series of ports arranged in a series of cycles, each tube being connected to its corresponding ports of the several cycles, a plurality of compartments and a plurality of selector arms, each arm having an opening through it, one end of the said opening adapted to register with any of the said ports, the other end of the said opening being connected to a corresponding compartment, the said selector arms adapted to have relative movement with the said ports, whereby any tube can be connected to any compartment by the relative movement of the said selector arms and the said ports.

23. A mechanism of the character described, comprising, a chamber, a piston in the said chamber adapted to be forced toward either end of the said chamber, a source of fluid pressure, a series of compartments, each compartment, when connected to the said source, adapted to control the flow of fluid through the said chamber in such manner whereby the piston is actuated in the particular manner predetermined for the said compartment, a series of tubes, means for connecting any of the said tubes with any of the said compartments, a record of motion in combination with means for connecting the said source to any of the said tubes in the succession called for by the marking of the record, whereby the piston is actuated in accordance with the marking of the record.

24. A mechanism of the character described, comprising, a source of fluid pressure, a series of tubes, means for connecting the said source with any of the said tubes, a series of compartments, means for connecting any of the said tubes with any of the said compartments, a chamber, a piston in the said chamber adapted to be forced toward either end of the said chamber, the said compartments being connected to the said chamber, some on one side of the said piston, others on the other side of the said piston, whereby motion of the piston is caused in accordance with which compartment is connected to the source.

25. A mechanism of the character described, comprising, a source of fluid pressure, a record of motion in combination with means for connecting the said source to any of a series of tubes, the said series of tubes, a series of compartments, means for connecting any of the said tubes with any of the said compartments, a chamber, a piston in the said chamber adapted to be forced toward either end of the said chamber, the said compartments being connected to the said chamber, some on one side of the said piston, others on the other side of the said piston, whereby the motion of the piston is caused in accordance with which compartment is connected to the source.

26. A mechanism of the character described, comprising, a source of fluid pressure, a record of motion in combination with means for connecting the said source to any of a series of tubes, the said series of tubes, a series of compartments, means for connecting any of the said tubes with any of the said compartments, a chamber, a piston in said chamber adapted to be forced to either end of the said chamber, the said means for connecting the tubes with the said compartments being controlled by the action of the said piston, the said compartments being connected to the said chamber, some on one side of the said piston, others on the other side of the said piston, whereby the motion of the piston is caused in accordance with which compartment is connected to the source.

27. A mechanism of the character described, comprising, a source of fluid pressure, a perforated record in combination with means for connecting the said source to any of a series of tubes, a series of compartments, means for connecting any of the said tubes with any of the said compartments, a chamber, a piston in said chamber adapted to be forced toward either end of the said chamber, each of the said compartments, when connected to the said source, adapted to control the flow of fluid through the said chamber in such manner, whereby the piston is actuated in the particular manner predetermined for the said compartment and thereby the motion of the piston is caused in accordance with which compartment is connected to the source.

28. A mechanism of the character described, comprising a source of fluid pressure, a perforated record, tracker ducts, means for producing relative movement between the said record and the said tracker ducts, a series of valves, each valve adapted to permit the flow of the fluid between the said source and one of a series of tubes, the particular valves being actuated by perforations passing over their corresponding tracker ducts, the said series of tubes, a series of compartments, means for connecting any of the said tubes with any of the said compartments, a chamber, a piston in said chamber adapted to be forced to either end of the said chamber, each of the said compartments, when connected to the said source, adapted to control the flow of fluid through the said chamber in such manner whereby the piston is actuated in the particular manner predetermined for the said compartment and thereby the motion of the piston is caused in accordance with which compartment is connected to the source.

29. A mechanism of the character described, comprising, a source of fluid pressure, a perforated record of motion in combination with means for connecting the said source to any of a series of tubes, the said series of tubes, a series of compartments, means for connecting any of the said tubes with any of the said compartments, a chamber, a piston in the said chamber adapted to be forced to either end of the said chamber, some compartments of the said series of compartments being connected to the said chamber on one side of the said piston, whereby the said piston is forced to one end of the said chamber, others being connected to the said chamber on the opposite side of the said piston, whereby the said piston is forced to the opposite end of the said chamber, valves adapted to equalize the pressure on both sides of the said piston, another of the said series of compartments connected to the said valves actuating same, whereby the piston is actuated in accordance with which compartment is connected to the source.

30. A mechanism of the character described comprising a source of air pressure, a record of motion in combination with means for connecting the said source to any of a series of tubes, the said series of tubes, a series of compartments, means for connecting any of the said tubes with any of the said compartments, a chamber, a piston in the said chamber, adapted to be forced toward either end of the said chamber, some compartments of the said series of compartments adapted to be connected to the said chamber on one side of the said piston, others adapted to be connected to the said chamber on the opposite side of the said piston, a corresponding series of valves, the said valves adapted to simultaneously connect any compartment to the said chamber on one side of the piston and to connect the opposite side of the said piston to the atmosphere, whereby the motion of the piston is caused in accordance with which compartment is connected to the source.

31. A mechanism comprising a source of fluid pressure, a body suitably mounted to have motion, a record marked in accordance with the desired successive directions of motion in combination with means for connecting the said source to a plurality of tubes by the relative movement of the record and a part of said means, whereby the said tubes are connected to the said source in the succession called for by the marking of the record, the said tubes, selector arms, each arm having an opening through it, adapted to have relative movement with the ends of the said tubes in a fixed relation to the motion of the body, adapted while registering with the tube connected to the source to control the motion of the body and to control the relative movement of the record.

32. A mechanism comprising a source of fluid pressure, a body suitably mounted to have motion, a record of motion in combination with means for connecting the said source to a plurality of tubes by the relative movement of the record and a part of the said means, whereby the said tubes are connected to the said source in the succession called for by the marking of the record, the said tubes, means for causing the said relative movement of the record, selector arms, each arm having an opening through it, adapted to have relative movement with the ends of the said tubes in a fixed relation to the motion of the body, adapted while registering with a tube connected to the source to control the relative movement of the record.

33. A mechanism comprising a source of fluid pressure, a body suitably mounted to have motion, means for controlling the motion of the body by the flow of said fluid through a part of the said means, a record of motion in combination with means for connecting the said source to a plurality of tubes by the relative movement of the record and a part of the said means, whereby the said tubes are connected to the said source, in the succession called for by the marking of the record, means for causing the said relative movement, the said tubes, selector arms, each arm having an opening through it, adapted to have relative movement with the ends of the said tubes in a fixed relation to the motion of the body, each selector arm, while registering with a tube connected to the source being adapted by its particular connection to cause a particular state of flow of fluid simultaneously through the said part of the means causing the motion of the body and the said means for causing the relative movement of the record thereby causing the relative movement of the record and the motion of the body in a given manner predetermined for the selector arm by its particular connection.

34. A mechanism comprising a source of fluid pressure, a body suitably mounted to have motion, means for controlling the motion of the body by the flow of said fluid through a part of the said means, a record of motion in combination with means for connecting the said source to any of a plurality of tubes by the relative movement of the record and a part of the said means, whereby the said tubes are connected to the said source in the succession called for by the marking of the record, means for causing the said relative movement, the said tubes, selector arms, each arm having an opening through it, adapted to have relative movement with the ends of the said tubes in a fixed relation to the motion of the body, some of said selector arms while registering with a tube connected to source adapted by their connections to control the motion of the body and to cause the relative movement of the record, the others of the said selector arms while registering with a tube connected to source adapted by their connections to control the motion of the body and to stop the relative movement of the record, whereby the motion of the body and the said relative movement of the record are kept in synchronism.

35. A mechanism comprising, a plurality of bodies, suitably mounted, capable of having differing motions, a record marked in accordance with the desired successive directions of motion for the several bodies in combination with means for controlling the motions of the several bodies by the relative movement of the record and a part of said means, means for producing the said relative movement, a chamber, a piston in the said chamber adapted to control the said means for producing the relative movement of the record, a source of fluid pressure, a set of selector arms for each of the said bodies, each set having a fixed relation to the motion of its respective body, the said sets adapted to coact to control the flow of fluid from the said source through the said chamber whereby the said relative movement of the record is controlled in accordance with the motions of all of the said bodies.

36. A mechanism comprising, a plurality of bodies, suitably mounted, capable of having different motions, a record of motion in combination with means for controlling the motions of the several bodies by the relative movement of the record and a part of the said means, means for producing the said relative movement, a chamber, a piston in the said chamber adapted to actuate the said means for producing the said relative movement of the record, a source of fluid pressure, selector arms having a fixed relation to the motions of their respective bodies, adapted to coact to control the flow of fluid from the said source through the said chamber in such manner whereby the said relative movement of the record is caused when the record is in proper relation to the motions of all of the said bodies.

37. A mechanism comprising, a body suitably mounted to have motion, a record marked in accordance with the desired speeds and directions of motion in combination with means for controlling the motion of the body by the relative movement of the record and a part of said means, means for producing the said relative movement, a chamber, a piston in the said chamber adapted to control the said means for producing the relative movement of the record, a source of fluid pressure, selector arms having a fixed relation to the motion of the body and adapted to control the flow of fluid from said source through the said chamber in such manner whereby the driving action of the said means for producing the relative motion of the record is suspended when the record is not in proper relation to the motion of the body.

38. A device of the character described, comprising a body suitably mounted to have motion, mechanism for controlling the said motion, a selector, comprising a plurality of tubes, and a plurality of selector arms, each arm having an opening through it, the relative movement between the said selector arms and the ends of the said tubes being in a fixed relation to the motion of the body, a source of fluid pressure, a record marked in accordance with the desired speeds and directions of motion, means for producing relative movement of the record and a part of the said motion controlling mechanism, whereby the said tubes are connected to the said source in the succession called for by the marking of the record, the said selector arms adapted, while registering with a tube connected to the source, to cause motion of the body and to cause the said relative movement of the record, the said selector arms adapted to register simultaneously with the ends of several of the said tubes, thereby permitting the said several tubes to be connected to the source in any succession without corresponding motion of the body, means adapted to stop the said relative movement of the record when a tube connected to the source occurs beyond the range of the said selector arms, whereby retardation of the operation of the device is reduced.

39. A device of the character described, comprising, a plurality of bodies, suitably mounted, capable of having differing motions, a record marked in accordance with the desired speeds and directions of motion of the several bodies in combination with means for controlling the motions of the several bodies by the relative movement of the record and a part of the said means, means for producing the said relative movement, a chamber, a piston in the said chamber adapted to control the said means for producing the relative movement of the record, a source of fluid pressure, selector arms, having a fixed relation to the motions of their respective bodies, adapted to coact to control the flow of fluid from the said source through the said chamber in such manner whereby the said relative movement of the record is retarded when not in proper relation with the motions of all of the said bodies.

40. A device of the character described, comprising, a plurality of bodies, suitably mounted, capable of having differing motions, a record of motion in combination with means for controlling the motions of the several bodies by the relative movement of the record and a part of said means, means for producing the said relative movement, a chamber, a piston in the said chamber adapted to control the said means for producing the relative movement of the record, a source of fluid pressure, selector arms, having a fixed relation to the motions of their respective bodies, each selector arm, independently of the rest, adapted to control the flow of fluid from the said source through the said chamber in such manner, whereby the said relative movement of the record is stopped when not in proper relation with the motions of all of the said bodies.

41. A mechanism comprising a plurality of bodies suitably mounted capable of having differing motions, a record of motion in combination with means for controlling the motions of the several bodies by the relative movement of the record and a part of said means, means for producing the said relative movement, a chamber, a piston in the said chamber adapted to control the said means for producing the relative movement of the record, a source of fluid pressure, selector arms, having a fixed relation to the motions of their respective bodies, each selector arm, independently of the rest, adapted to stop the flow of fluid from the said source through the said chamber whereby the said relative movement of the record is stopped when not in proper relation to the motions of all of the said bodies.

42. A mechanism comprising a body suitably mounted to have motion, a record marked in accordance with the desired speeds and directions of motion in combination with means for controlling the motion of the body by the relative movement of the record and a part of said means, means for producing the said relative movement, a chamber, a piston in the said chamber adapted to actuate the said means for producing the relative movement of the record, a source of fluid pressure, selector arms, having a fixed relation to the motion of the body and adapted to control the flow of fluid from said source through the said chamber in such manner whereby the said relative movement of the record is caused when a proper relation obtains between the body and the record.

43. A mechanism comprising a body suitably mounted to have motion, a record of motion in combination with means for controlling the motion of the body by the relative movement of the record and a part of said means, a chamber, a piston in the said chamber adapted to actuate the said means for producing the relative movement of the record, means for producing the said relative movement, a source of fluid pressure, selector arms having a fixed relation to the motion of the body and adapted to cause the flow of fluid from the said source through the said chamber whereby the said relative movement of the record is caused when a proper relation obtains between the body and the record.

44. A mechanism comprising a source of fluid pressure, a body suitably mounted to have motion, a record marked in accordance with the desired speeds and directions of motion in combination with means for connecting the said source to a plurality of tubes by the relative movement of the record and a part of the said means, whereby the said tubes are connected to the said source in the succession called for by the marking of the record, the said tubes, selector arms, each arm having an opening through it, adapted to have relative movement with the ends of the said tubes in a fixed relation to the motion of the body, adapted, while registering with a tube connected to the source, to cause motion of the body and to stop the said relative movement of the record.

45. A device of the character described, comprising a body suitably mounted to have motion, mechanism for controlling said motion, a selector having a plurality of tubes and a plurality of selector arms, each arm having an opening through it, the relative movement between said selector arms and the ends of the said tubes being in a fixed relation to the motion of the body, a record marked in accordance with the desired successive directions of motion, means for producing relative movement of the record and a part of said motion controlling mechanism whereby the said tubes are connected to the said source in the succession called for by the marking of the record, means adapted to stop the motion of the body and to stop the relative movement of the record, when the end of a tube connected to the source occurs beyond the range of the said selector arms.

46. A mechanism of the character described, comprising, a source of fluid pressure, a series of tubes, a record of motion in combination with means for connecting the said source with any of the said tubes by the relative movement of the record and a part of the said means, mechanism for causing the said relative movement, a plurality of compartments, means for connecting any of the said compartments with any of the said tubes, a chamber, a piston in the said chamber adapted to control the said relative movement of the record, valves for controlling the flow of fluid through the said chamber, adapted to be actuated by the particular compartments connected to the source whereby the said relative movement of the record is controlled.

47. A mechanism of the character described, comprising, a source of fluid pressure, a series of tubes, a record of motion in combination with means for connecting the said source with any of the said tubes by the relative movement of the record and a part of the said means, mechanism for causing the said relative movement, a plurality of compartments, means for connecting any of the said compartments with any of the said tubes, means for controlling the mechanism causing the said relative movement of the record adapted to be actuated by the particular compartments connected to source whereby the said relative movement of the record is controlled.

48. A device of the character described comprising a source of fluid pressure, a record of motion in combination with means for connecting the said source to any of a plurality of compartments, by the relative movement of the record and a part of the said means, mechanism for causing the said relative movement, a chamber adapted to have communication with the said source, a plurality of valves adapted when any one of them is actuated to permit the said communication, a piston, adapted to control the said mechanism for causing the relative movement of the record, by its position in the said chamber, as determined by the actuation of the said valves, each valve being connected to one of the said compartments, adapted to be actuated when its corresponding compartment is connected to source.

49. A device of the character described, comprising, a source of fluid pressure, a record of motion in combination with means for connecting the said source to any of a plurality of compartments by the relative movement of the record and a part of the said means, mechanism for causing the said relative movement of the record, a plurality of valves, adapted, when actuated, to actuate the said mechanism, each of the said valves adapted to be actuated by a corresponding compartment, when the said compartment is connected to the said source, the said compartments, whereby the said relative movement of the record is caused when any of the said compartments is connected to the said source.

50. A mechanism of the character described, comprising, a source of fluid pressure, a record of motion in combination with means for connecting the said source to any of a plurality of sets of compartments by the relative movement of the record and a part of the said means, the said plurality of sets of compartments, mechanism for causing the said relative movement, a plurality of sets of valves, a set of valves corresponding to a set of the said compartments, the said valves adapted, when some of the said valves in each of the said sets of valves are actuated, to actuate the mechanism causing the said relative movement, the said valves, each of the said valves adapted to be actuated by a corresponding compartment when the said compartment is connected to the source, whereby the said relative movement of the record is caused when some of the compartments of each of the said sets of compartments are connected to the said source.

51. A mechanism comprising a body suitably mounted, adapted to be guided in its motion, a piece of material adapted to be marked as a record of said motion, a source of fluid pressure, means for marking the said piece controlled by the flow of said fluid through a part of the said means, means actuated by the motion of the body for controlling the flow of said fluid through the marking means, whereby the kind, speed and direction of the motion of the body are recorded.

52. A mechanism comprising a body suitably mounted, adapted to be guided in its motion, a piece of material adapted to be marked as a record of said motion, a source of fluid pressure, means for marking the said piece, a plurality of pneumatics for actuating the said marking means, controlled by the flow of fluid through the said pneumatics, means actuated by the motion of the body for controlling the flow of fluid through the said pneumatics, whereby the kind, speed and direction of the motion of the body are recorded.

53. A mechanism comprising a body suitably mounted upon a plurality of mountings adapted to be guided in its motion, the said plurality of mountings adapting the motion of the body to be divided into components, each mounting for a predetermined component motion of the body, a piece of material adapted to be marked as a record of said motion, a source of fluid pressure, means for marking the said piece, a plurality of pneumatics for actuating the said marking means, controlled by the flow of fluid through the said pneumatics, means actuated by the motions of the several component mountings for controlling the flow of fluid through the said pneumatics, whereby the speeds and directions of the several component motions are recorded simultaneously in their proper relation to each other.

54. A mechanism comprising a plurality of bodies adapted to be guided in their motions, suitably mounted to have simultaneously differing motions, a piece of material adapted to be marked as a record of said motions, a source of fluid pressure, means for marking the said piece, a plurality of pneumatics for actuating the said marking means, controlled by the flow of fluid through the said pneumatics, means actuated by the motions of the said bodies, for controlling the flow of fluid through the said pneumatics, whereby the motions of the several bodies are recorded in kind, speed and direction and in a predetermined relation to each other.

55. A mechanism comprising a body suitably mounted adapted to be guided in its motion, a sheet of material adapted to be marked as a record of said motion, a source of fluid pressure, a series of pieces for marking the said sheet, a corresponding series of pneumatics controlled by the flow of energy through them for actuating the said series of marking pieces, means actuated by the motion of the body for selecting the flow of fluid through the said pneumatics in such manner whereby the kind, speed and direction of the motion of the body are recorded.

56. A mechanism comprising, a body suitably mounted adapted to be guided in its motion, a sheet of material, means for causing relative movement between the said sheet and a series of punches, the said series of punches adapted to perforate the said sheet, a source of fluid pressure, a corresponding series of pneumatics controlled by the flow of fluid through them for actuating the said punches, means controlled by the motion of the said body for controlling the flow of fluid through the said pneumatics whereby the kind, speed and direction of the motion of the body are recorded.

57. A mechanism of the character described, comprising, means for feeding a sheet of material, means for marking the said sheet, reciprocating means adapted to reciprocate at intervals corresponding to a predetermined feed of the said sheet, a source of fluid pressure, a series of pneumatics adapted when connected to the said source to cause the said marking means to engage with the said reciprocating means, thereby actuating the said marking means, a body suitably mounted adapted to be guided in its motion, means actuated by the motion of the said body, for causing a succession of the said pneumatics to be connected to the said source, whereby the motion of the said body is recorded on the said sheet in a succession of marks.

58. A mechanism of the character described, comprising, means for feeding a sheet of material, a series of punches, adapted to perforate the said sheet, reciprocating means, adapted to reciprocate at intervals corresponding to a predetermined feed of the said sheet, a source of fluid pressure, a series of pneumatics corresponding to the said series of punches, adapted, when connected to the said source, to cause the said punches to engage with the said reciprocating means, thereby actuating the said punches, a body suitably mounted adapted to be guided in its motion, means, actuated by the motion of the said body, for causing a succession of the said pneumatics to be connected to the said source, whereby the motion of the said body is recorded in a succession of perforations.

59. A mechanism of the character described, comprising, means for feeding a sheet of material, a series of punches adapted to perforate the said sheet, a rock shaft, means to cause said rock shaft to rock at intervals corresponding to a predetermined feed of the said sheet, pieces connected to the said rock shaft and reciprocated by same, a series of pneumatics, corresponding to the said series of punches, adapted, when connected to the said source, to cause the said punches to engage with the said reciprocating pieces, thereby actuating the said punches, a body, suitably mounted, adapted to be guided in its motion, means, actuated by the motion of the said body, for causing a succession of the said pneumatics to be connected to the said source, whereby the motion of the body is recorded in a succession of perforations.

60. A mechanism comprising, a body suitably mounted adapted to be guided in its motion, a piece of material adapted to be marked as a record of said motion, a source of fluid pressure, a series of means for marking the said piece, the said means controlled by the flow of fluid through them, a plurality of tubes, each tube connected to corresponding marking means, a selector arm, having an opening through it, adapted to have relative movement with the ends of the said tubes in a fixed relation to the motion of the body and adapted, while registering with the end of a tube connected to the source, to control the flow of fluid through the marking means corresponding to the said tube, whereby the motion of the body causes a particular succession of the marking means to be actuated, corresponding to the motion of the body and thereby the speed and direction of the motion of the body are recorded.

61. A mechanism comprising a body suitably mounted upon a plurality of mountings, adapted to be guided in its motion, the said plurality of mountings adapting the motion of the body to be divided into components, each mounting for a predetermined component motion of the body, a piece of material adapted to be marked as a record of said motions, a source of fluid pressure, a series of means for marking the said piece, the said means controlled by the flow of fluid through them, a plurality of sets of tubes, a set for each of the said components of the motion of the body, each tube connected to corresponding marking means, a plurality of selector arms, each arm having an opening through it, an arm for each of the said sets of tubes, the said selector arms, each arm adapted to have relative movement with the ends of its respective set of tubes in a fixed relation to its corresponding component motion of the body and adapted, while registering with a tube connected to the source, to control the flow of fluid through the marking means corresponding to the said tube, whereby the motion of the body causes a particular succession of the said marking means to be actuated corresponding to its motion, and thereby the kind, speed and direction of the motion of the body are recorded.

62. A mechanism comprising a body suitably mounted adapted to be guided in its motion, a piece of material adapted to be marked as a record of said motion, a source of fluid pressure, a series of means for marking the said piece, the said means controlled by the flow of fluid through them, a plurality of tubes connected to corresponding ports arranged in a series of cycles, the corresponding ports of the several cycles connected to each other and to the same marking means, a selector arm, having an opening through it, adapted to have relative movement with the said ports in a fixed relation to the motion of the body and adapted, while registering with a port connected to source, to control the flow of fluid through the marking means corresponding to the said port whereby the motion of the body causes a particular succession of the said marking means to be actuated, corresponding to its motion, and thereby the speed and direction of the motion of the body are recorded.

63. A mechanism comprising a body suitably mounted adapted to be guided in its motion, a piece of material adapted to be marked as a record of said motion, a source of fluid pressure, a series of means for marking the said piece, the said means controlled by the flow of fluid through them, a plurality of tubes connected to corresponding ports arranged in a ring, each tube connected to corresponding marking means, a selector arm, having an opening through it, adapted to swing around the said ring of ports, the rotation of the said selector arm being in a fixed relation to the motion of the body, the said selector arm adapted, while registering with a port connected to the source, to control the flow of fluid through the marking means corresponding to the said port, whereby the motion of the body causes a particular succession of the said marking means to be actuated corresponding to its motion and thereby the speed and direction of the motion of the body are recorded.

64. A mechanism comprising, a body suitably mounted to have motion, mechanism for driving the said body, a source of fluid pressure, a record of motion marked in accordance with the desired speeds and directions of motion of the said body, intervening mechanism between the record and the said driving mechanism, the markings of the said record being adapted to control the transmission of the said fluid pressure through the said intervening mechanism controlling thereby the actuation of the said driving mechanism, the said intervening mechanism adapted to be reacted upon by the motion of the body as effected by the record, in such manner that the said transmission of the said fluid pressure to the said driving mechanism is modified to cause the body to be at every instant within the limits of a predetermined deviation from the position called for by the record at the corresponding instant the construction of the said intervening mechanism determining the extent of the said deviation.

65. A mechanism comprising a body suitably mounted to have motion mechanism for driving the said body, a source of fluid pressure, a record of motion perforated in accordance with the desired speeds and directions of motion of the said body, intervening mechanism between the record and the said driving mechanism, the perforations of the said record being adapted to control the transmission of the said fluid pressure through the said intervening mechanism controlling thereby the actuation of the said driving mechanism, the said intervening mechanism adapted to be reacted upon by the motion of the body as effected by the record, in such manner, that the said transmission of the said fluid pressure to the said driving mechanism is modified to cause the body to be at every instant within the limits of a predetermined deviation from the position called for by the record at the corresponding instant, the construction of the said intervening mechanism determining the extent of the said deviation.

66. A mechanism comprising a body suitably mounted to have translation in all directions in a plurality of planes, mechanism for driving the said body, a source of fluid pressure, a record of motion marked in accordance with the desired speeds and directions of motion of the said body, intervening mechanism between the record and the said driving mechanism, the markings of the said record being adapted to control the transmission of the said fluid pressure through the said intervening mechanism controlling thereby the actuation of the said driving mechanism, the said intervening mechanism adapted to be reacted upon by the motion of the body as effected by the record, in such manner that the said transmission of the said fluid pressure to the said driving mechanism is modified to cause the body to be at every instant within the limits of a predetermined deviation from the position called for by the record at the corresponding instant, the construction of the said intervening mechanism determining the extent of the said deviation.

67. A mechanism comprising a body suitably mounted adapted to have rotation in reversible directions, mechanism for driving the said body, a source of fluid pressure, a record of motion marked in accordance with the desired speeds and directions of rotation of the body, intervening mechanism, between the record and the said driving mechanism, suitably constructed to be in control of unlimited rotation of the said body in each direction, the markings of the said record being adapted to control the transmission of the said fluid pressure through the said intervening mechanism, controlling thereby the actuation of the said driving mechanism, the said intervening mechanism adapted to be reacted upon by the rotation of the body as effected by the record, in such manner, that the said transmission of the said fluid pressure to the said driving mechanism is modified to cause the body to be at every instant within the limits of a predetermined deviation from the position called for by the record at the corresponding instant, the construction of the said intervening mechanism determining the extent of the said deviation.

68. A mechanism comprising a body suitably mounted to have motion, mechanism for driving said body, a selective device actuated by and in accordance with the motion of the body, a source of fluid pressure, a record of motion marked in accordance with the desired speeds and directions of motion of the said body, the markings of the said record being adapted to control the transmission of the said fluid pressure through the said selective device, controlling thereby the actuation of the said driving mechanism, each mark adapted to cause the said driving mechanism to cause the same extent of motion to the body as every other mark, except that a mark immediately succeeding one in a similar position on the record, is adapted to suspend the driving action.

69. A device of the character described comprising a body suitably mounted adapted to have motion, mechanism for controlling the driving of the said body, a source of fluid pressure, a selective mechanism consisting of two parts, namely, a plurality of ports and means for stopping or permitting the transmission of the fluid pressure through the said ports, the said two parts adapted to have relative movement to each other in a fixed relation to the motion of the body, a record of motion marked in accordance with the desired successive directions of motion of the body, the marks of the record being spaced close enough together in the direction of the feed of the record so that there is always at least one actuating port at every instant, thereby permitting the operation of the device to be continuous.

70. A device of the character described comprising a body suitably mounted adapted to have motion, mechanism for controlling the driving of the said body, a source of fluid pressure, a selective mechanism consisting of two parts, namely, a plurality of ports and means for stopping or permitting the transmission of the fluid pressure through the said ports, the said two parts adapted to have relative movement to each other in a fixed relation to the motion of the body, a record of motion perforated in accordance with the desired successive directions of motion of the body, the perforations of the record being spaced close enough together in the direction of the feed of the record so that there is always at least one actuating port at every instant, thereby permitting the operation of the device to be continuous.

71. A device of the character described, comprising a body suitably mounted adapted to have motion, mechanism for controlling the driving of the said body, a source of fluid pressure, a selective mechanism consisting of two parts, namely, a plurality of ports and means for stopping or permitting the transmission of the fluid pressure through the said ports, the said two parts adapted to have relative movement to each other in a fixed relation to the motion of the body, a record of motion marked in accordance with the desired motion of the body, the marks of the record being spaced with an overlap in the direction of feed of the record, thereby permitting the operation of the device to be continuous.

72. A device of the character described, comprising a body suitably mounted adapted to have motion, mechanism for controlling the driving body of the said body, a source of fluid pressure, a selective mechanism consisting of two parts, namely, a plurality of ports and means for stopping or permitting the transmission of the fluid pressure through the said ports, the said two parts adapted to have relative movement to each other in a fixed relation to the motion of the body, a record of motion perforated in accordance with the desired motion of the body, the perforations of the record being spaced with an overlap in the direction of feed of the record, thereby permitting the operation of the device to be continuous.

73. A mechanism, a body suitably mounted to have motion, a source of fluid pressure, mechanism adapted to be controlled by the flow of fluid to it, for driving the said body, a record marked in accordance with the desired motion of the body, a selective device having a plurality of ports, a fixed length of the said ports at any time adapted to be suitably connected to the said driving mechanism, for causing motion of the body in the forward direction, and another fixed length of the said ports at any time adapted to be suitably connected to the said driving mechanism for causing motion of the body in the backward direction, each mark of the record in control at any instant adapted to coöperate with the selective device to send the flow of the fluid through the length for motion of the body in the forward direction, when the position of the body at any instant is behind that called for by the mark of the record in control, and to send the flow through the length for motion in the backward direction when the position of the body at any instant is ahead of that called for.

74. A mechanism comprising, a body suitably mounted to have motion, mechanism for driving the said body, a record of motion marked in accordance with the desired motion of the body, a source of fluid pressure, a selector comprising a plurality of ports arranged in a ring and selecting means adapted to be swung around the said ring of ports by the motion of the body, adapted by the relative position of the ports to the selecting means to control the flow of fluid to the said driving mechanism causing actuation of the same for motion of the body in the forward direction when the position of the body is behind that called for by the record and in the backward direction when its position is ahead.

75. A mechanism comprising, a body suitably mounted to have motion, mechanism for driving the said body, a record of motion marked in accordance with the desired motion of the body, a source of fluid pressure, a selector comprising a plurality of ports arranged in a ring in a series of cycles, similar ports of the several cycles being in communication with each other, and means adapted to be swung around the said ring of ports by the motion of the body, the said means adapted to control the flow of fluid to the said driving mechanism whereby the motion of the body is held to that called for by the record.

76. A mechanism comprising, a body suitably mounted to have motion, a source of fluid pressure, a record of motion adapted to control the flow of fluid to a selector, the said selector comprising two parts, the first of the said parts having a plurality of ports in it and the second of the said parts adapted to control the flow of fluid through the said ports, mechanism, intervening between the body and the selector suitably constructed to cause the motion of the body to cause relative movement between the said ports and the said means for controlling the flow of fluid through the said ports, at a faster rate than the motion of the body, the record and the selector coöperating, whereby motion of the body is caused in accordance with that called for by the record.

77. A mechanism comprising, a body suitably mounted to have motion, a source of fluid pressure, a record of motion adapted to control the flow of fluid to a selector, the said selector comprising two members, one of the said members having a plurality of ports arranged in a ring, the other of the said members being rotatable, one end of the said rotatable member being adapted to be swung around the said ring of ports, controlling thereby the flow of fluid through the said ports, mechanism, intervening between the body and the said rotatable member, suitably constructed to cause the motion of the body to rotate the said rotatable member at a rate causing the motion of the end of the said rotatable member past the ports at a faster rate than the motion of the body, the record and the selector coöperating whereby motion of the body is caused in accordance with that called for by the record.

78. A mechanism comprising, a body suitably mounted to have rotation, a source of fluid pressure, a record of motion adapted to control the flow of fluid to a selector, the said selector comprising two members, one of the said members having a plurality of ports arranged in a ring, the other of the said members being rotatable, one end of the said rotatable member being adapted to be swung around the said ring of ports, controlling thereby the flow of fluid through the said ports, mechanism, intervening between the body and the said rotatable member, suitably constructed to cause the rotation of the body to rotate the said rotatable member at a faster rate than the rotation of the body, the record and the selector coöperating, whereby rotation of the body is caused in accordance with that called for by the record.

79. A device comprising, a source of fluid pressure, a plurality of tubes, a record marked in accordance with the desired speeds and directions of motion in combination with means for stopping and permitting the flow of the said fluid through the several tubes, a body suitably mounted to have motion, mechanism for causing motion of the body in accordance with the speed and direction of motion called for by the record, adapted to be controlled by the sequence of the said tubes traversed by the fluid, selecting means, coöperating with the record, controlled by the motion of the body, for selecting the sequence of the said tubes to be traversed by the fluid.

80. A device comprising, a body suitably mounted to have motion, a source of fluid pressure, fluid-pressure-actuated-means for causing the motion of the body, a record marked in accordance with the desired speeds and directions of motion, selecting means, mechanism for producing continuous relative movement between the said record and a part of the said selecting means, the said selecting means being suitably constructed to be actuated by the record and by the motion of the body for controlling the flow of fluid to the said motion causing means, whereby the motion of the body is controlled in speed and in direction in accordance with that called for by the markings of the record and in accordance with the speed of the said continuous relative movement.

81. A device comprising, a body suitably mounted to have motion, a record marked in accordance with the desired successive directions of motion, mechanism for controlling the said motion, a clutch for controlling the relative movement of the said record and a part of the said motion controlling mechanism, whereby the motion of the said body is controlled, fluid-pressure-actuated-means adapted to control the action of the said clutch, means, controlled by the motion of the body adapted to control the action of the said fluid-pressure-actuated means, whereby the said relative movement of the record is controlled by the motion of the body.

82. A device comprising, a body suitably mounted to have motion, a source of fluid pressure, a record marked in accordance with the desired motion of the body, a selective device, mechanism adapted to be controlled by the flow of fluid to them, one of the said mechanisms for controlling the motion of the said body, the other for producing the relative movement between the record and a part of the said selective device, the said selective device having a plurality of ports, a predetermined length of the said ports, at any time adapted to be suitably connected to the said mechanisms so that the motion of the body is controlled and relative movement of the record is produced, and another predetermined length of the said ports, at any time, adapted to be suitably connected to the said mechanisms so that the motion of the body is controlled and the actuation of the mechanism for producing the relative movement of the record is suspended, each mark of the record in control at any instant adapted to coöperate with the selective device to send the flow of fluid through a length as first mentioned when the position of the body is within a predetermined distance from the position called for by the mark and to send the flow through a length as mentioned second, when the position of the body is more than a predetermined distance from the position called for.

83. A device comprising, a body suitably mounted to have motion, a source of fluid pressure, a record marked in accordance with the desired successive directions of motion, mechanism for controlling the motion of the said body, selecting means adapted to coöperate with the record to control the flow of fluid to the said mechanism for controlling the motion of the body, whereby the motion of the body is caused in accordance with that called for by the record, the said selecting means also adapted to stop the motion of the body, when the position of the body varies more than a predetermined amount from that called for at any time by the record.

84. A device comprising, a body suitably mounted to have motion, mechanism for controlling the said motion, a record marked in accordance with the desired successive direction of motion, a source of fluid pressure, selecting means, means for producing relative movement between the record and a part of the said selecting means, the said selecting means adapted to coöperate with the record to control the flow of fluid to the said mechanism for controlling the motion of the body, whereby the motion of the body is caused in accordance with that called for by the record, the said selecting means, also adapted to stop the motion of the body and the relative movement of the record when the position of the body varies more than a predetermined amount from that called for at any time by the record.

85. A device comprising, a source of fluid pressure, a plurality of tubes, a body suitably mounted to have motion, mechanism, for controlling the motion of the said body, actuated in accordance with the particular tubes of the said tubes through which the fluid is flowing, a record of motion in combination with means for selecting the particular tubes through which the fluid is caused to flow, by the relative movement of the record and a part of the said means, means for causing the said relative movement of the record, adapted to be controlled by the flow of fluid through the same tubes controlling the actuation of the said mechanism for controlling the motion of the body, at the same time with the actuation of the said mechanism.

86. A mechanism comprising, a plurality of punches adapted to represent the positions of the body on the record blank by corresponding perforations in fixed locations transversely to the feed of the record, a pneumatic corresponding to each of the said punches adapted to control its selection, mechanism for feeding a record blank past the said punches, a body suitably mounted adapted to be given the desired motion, means adapted to select a succession of the said pneumatics corresponding to the successive positions of the body for every instant whereby a corresponding succession of the punches is selected while the body is in continuous motion, means adapted, while the body is in continuous motion, to actuate the punches in selection at instants, an interval apart, equal to the time taken for the record blank to feed a fixed distance, whereby the successive positions of the body while in continuous motion are recorded.

87. A mechanism comprising, a plurality of punches adapted to represent the positions of the body on the record blank by corresponding perforations in fixed locations transversely to the feed of the record, a pneumatic corresponding to each of the said punches adapted to control its selection, mechanism for feeding, with a continuous running motion, a record blank past the said punches, a body suitably mounted adapted to be given the desired motion, means adapted to select a succession of the said pneumatics corresponding to the successive positions of the body for every instant, whereby a corresponding succession of the punches is selected, means adapted to actuate the punches in selection at instants, an interval apart, equal to the time taken for the record blanks to feed a fixed distance, whereby the successive positions of the body are perforated on the record at intervals corresponding to a predetermined feed of the record.

88. A mechanism comprising, a plurality of punches adapted to represent the positions of the body on the record blank by corresponding perforations in fixed locations transversely to the feed of the record, a pneumatic corresponding to each of the said punches adapted to control its selection, mechanism for feeding, with a continuous running motion, a record blank past the said punches, a body suitably mounted adapted to be given the desired motion, means adapted to select a succession of the said pneumatics corresponding to the successive positions of the body for every instant, whereby a corresponding succession of the punches is selected while the body is in continuous motion, means adapted, while the body is in continuous motion, to actuate the punches in selection at instants, an interval apart, equal to the time taken for the record blanks to feed a fixed distance, whereby the successive positions of the body while in continuous motion are recorded on a continuously feeding record blank.

89. A mechanism comprising, a plurality of punches, adapted to represent the positions of the body on the record blank by corresponding perforations in fixed locations transversely to the feed of the record, a pneumatic corresponding to each of the said punches adapted to control its selection, mechanism for feeding a record blank past the said punches, a body suitably mounted adapted to be given the desired motion, means adapted to select a succession of the said pneumatics corresponding to the successive positions of the body, whereby a corresponding succession of the punches is selected, means adapted to actuate the punches in selection to perforate the record blank at instants an interval apart equal to the time taken for the record blank to feed a fixed distance, the said fixed distance being small enough to cause the perforations to overlap each other in the direction of feed of the record, whereby any two successive positions of the body overlap each other as recorded on the record.

90. A mechanism comprising, a body suitably mounted to have motion, a record marked in accordance with the desired successive directions of motion in combination with pneumatically controlled means for causing the motion of the body by the relative movement of the record and a part of the said motion causing means, pneumatically controlled means for producing the said relative movement, a neutral selector member, moving in a fixed relation to the motion of the body, adapted when the position of the body coincides within a predetermined limit of error with the position called for by the record; to suspend the driving action of the said motion causing means and to actuate the said means for producing the relative movement of the record to cause the said relative movement.

91. A mechanism comprising, a body suitably mounted to have motion, a series of tubes corresponding to predetermined positions of the body, a record marked in accordance with the successive directions of motion desired for the body, a source of fluid pressure, movable means adapted by their action to stop and permit the transmission of the fluid pressure through the said tubes, means for producing relative movement between the record and a part of the said movable means whereby the marks of the record are adapted to select and actuate the said movable means, mechanism for causing motion of the body in reversible directions, selecting means, suitably constructed to have relative motion with the said tubes in a fixed relation to the motion of the body, adapted to cause actuation of the said motion causing mechanism for motion of the body in the forward direction when the position of the body is more than a predetermined amount behind that called for by the record, in the backward direction when its position is ahead more than the said amount, and to cause cessation of the driving action of the said motion causing mechanism when its position is out less than the said amount, the said selecting means at the same time adapted to cause action of the said means for producing the relative movement of the record to produce the said relative movement when the position of the body deviates less than a second predetermined amount, larger than the said first mentioned amount, and to cause actuation for slowing down the said relative movement when the deviation is more than the said second amount.

In testimony thereof, I hereby annex my signature this 12th day of March, 1913.

EMANUEL SCHEYER.

Witnesses:
 ALFRED BRADY,
 SAMUEL SINGER.